(12) United States Patent
Troxel et al.

(10) Patent No.: US 7,028,099 B2
(45) Date of Patent: Apr. 11, 2006

(54) NETWORK COMMUNICATION BETWEEN HOSTS

(75) Inventors: Gregory Donald Troxel, Stow, MA (US); Gwendolyn Jean Gesler, Melrose, MA (US)

(73) Assignee: BBNT Solutions LLC, Cambridge, MA (US)

( * ) Notice: Subject to any disclaimer, the term of this patent is extended or adjusted under 35 U.S.C. 154(b) by 839 days.

(21) Appl. No.: 09/736,827

(22) Filed: Dec. 14, 2000

(65) Prior Publication Data
US 2002/0078127 A1 Jun. 20, 2002

Related U.S. Application Data

(60) Provisional application No. 60/232,524, filed on Sep. 14, 2000.

(51) Int. Cl.
*G06F 15/173* (2006.01)

(52) U.S. Cl. .................................. 709/239; 709/238
(58) Field of Classification Search ......... 709/238–244; 455/433; 370/217, 219
See application file for complete search history.

(56) References Cited

U.S. PATENT DOCUMENTS

| | | | |
|---|---|---|---|
| 5,325,362 A | 6/1994 | Aziz | |
| 5,473,599 A * | 12/1995 | Li et al. ..................... | 370/219 |
| 5,490,139 A | 2/1996 | Baker et al. | |
| 5,862,345 A | 1/1999 | Okanoue et al. | |
| 6,049,825 A * | 4/2000 | Yamamoto .................. | 709/221 |
| 6,178,455 B1 * | 1/2001 | Schutte et al. ............. | 709/228 |
| 6,195,705 B1 | 2/2001 | Leung | |
| 6,324,161 B1 * | 11/2001 | Kirch ......................... | 370/217 |
| 6,385,174 B1 | 5/2002 | Li | |
| 6,407,988 B1 | 6/2002 | Agraharam et al. | |
| 6,496,505 B1 | 12/2002 | La Porta et al. | |
| 6,578,085 B1 | 6/2003 | Khalil et al. | |
| 6,591,306 B1 | 7/2003 | Redlich | |
| 6,636,498 B1 | 10/2003 | Leung | |
| 6,654,359 B1 | 11/2003 | La Porta et al. | |
| 6,690,659 B1 | 2/2004 | Ahmed et al. | |
| 6,697,354 B1 | 2/2004 | Borella et al. | |
| 2001/0036834 A1 | 11/2001 | Das et al. | |
| 2001/0044305 A1 | 11/2001 | Reddy et al. | |
| 2001/0046223 A1 | 11/2001 | El Malki et al. | |
| 2002/0015395 A1 | 2/2002 | Karagiannis | |
| 2002/0021689 A1 | 2/2002 | Robbins et al. | |
| 2002/0026527 A1 | 2/2002 | Das et al. | |
| 2004/0024901 A1 | 2/2004 | Agrawal et al. | |

OTHER PUBLICATIONS

Narten, T., et al.; "Neighbor Discovery for IP Version 6 (IPv6)", RFC 2461, Dec. 1998, pp.: 1–37.*

Perkins, C., ed.; "IP Mobility Support", RFC 2002, Oct. 1996, pp.:1–5.*

Corson, S.; "Mobile Ad hoc Networking (MANET)", RFC 2501, Jan. 1999, pp.: 1–9.*

RFC 2328, Moy, J. OSPF Version 2, Apr. 1998. www.itef.org.

Sportack, Mark A., "IP Routing Fundamentals," Cisco Press, Feb. 19, 1999.

Tannenbaum, Computer Networks, 1996, pp. 367–369.

Corson, et al, RFC 2501, Internet Engineering Task Force RFC Repository, Jan. 1999, pp. 1–12.

Perkins, RFC 2002, Internet Engineering Task Force RFC Repository, Oct. 1996, pp. 1–79.

Narten, et al, RFC 2461, Internet Engineering Task Force RFC Repository, Dec. 1998, pp. 1–93.

(Continued)

*Primary Examiner*—Frantz B. Jean
(74) *Attorney, Agent, or Firm*—Ropes & Gray LLP

(57) ABSTRACT

The invention enables hosts that do not share a network prefix to communicate in the event the hosts are unable to communicate with a router.

19 Claims, 25 Drawing Sheets

OTHER PUBLICATIONS

Montenegro, RFC 2344, Internet Engineering Task Force RFC Repository, May 1998, pp. 1–19.
Thomson, et al, RFC 2462, Internet Engineering Task Force RFC Repository, Dec. 1998, pp. 1–25.
Derring, et al, RFC 2460, Internet Engineering Task Force RFC Repository, Dec. 1998, pp. 1–39.
Droms, RFC 2131, Internet Engineering Task Force RFC Repository, Mar. 1997, pp. 1–45.
Johnson, David, "Mobility Support in IPv6," Apr. 27, 2000, pp. 1–77.
C. Perkins, D. Johnson, "Route Optimization in Mobile IP," Internet Draft, IETF, Feb. 2000, pp. 1–103.
Perkins, "IP Mobility Support for IPv4," Internet Draft, IETF, Jul. 13, 2000, pp. 1–99.
Karagiannis, G. Mobile IP–State of the Art Report. Ericsson, pp. 1–63 (1999).

* cited by examiner

NETWORK COMMUNICATION BETWEEN HOSTS

CROSS-REFERENCE TO RELATED APPLICATIONS

This application relates to U.S. patent application Ser. No. 09/736,807 entitled DELIVERING MESSAGES TO A NODE AT A FOREIGN NETWORK; and U.S. patent application Ser. No. 09/737,108 entitled PUBLISHING NODE INFORMATION; and U.S. patent application Ser. No. 09/736,834 entitled ROUTING MESSAGES BETWEEN NODES AT A FOREIGN SUB-NETWORK. These applications were filed on the same day as the present application and are incorporated by reference in their entirety herein. This application claims priority from U.S. Provisional Serial No. 60/232,524, filed Sep. 14, 2000, entitled SEAMLESS IP COMMUNICATION IN A HIGHLY MOBILE ENVIRONMENT, incorporated by reference in its entirety herein.

STATEMENT REGARDING FEDERALLY SPONSORED RESEARCH OR DEVELOPMENT

Work described herein was supported by government contract F30602-97-C-0340 awarded by U.S. AIR FORCE 0. The United States Government may have certain rights.

BACKGROUND OF THE INVENTION

1. Field of the Invention

This invention relates to network message delivery to network nodes.

2. Description of Related Art

Computer networks enable widely separated users and computers to exchange messages. Since computers exchanging messages rarely share a direct connection, messages ("datagrams") often wend their way through a number of network routers that incrementally advance a message towards its destination. Just as a street address on an envelope identifies a particular home to a mail carrier, a network address identifies a particular node (e.g., a computer) on a network. By examining a destination network address of a message, network routers can forward the message along a path from the message's source to the message's destination.

FIG. 1 shows an example of message delivery over a network. As shown in FIG. 1, a source computer 102 sends a message 106 to a destination computer 110 via a network 108 of routers (circles a–i). As shown, the message 106 includes the network address ("10.1.98.49") of the destination node 110. The destination address shown is an IP (Internet Protocol) address. An IP address is an example of a network layer address. As shown, the IP address can be expressed in a notation that uses a string of numbers separated by periods, with each number identifying eight bits of the IP address.

Routers typically maintain routing tables that store information on how to forward messages destined for particular IP addresses. For example, a routing table maintained by router "a" may include an entry that specifies that messages destined to IP address "10.1.98.49" should be forwarded to router "e".

Because of the vast number of devices that may reside on a network, a routing table having an individual entry for each individual IP address could grow so large that looking up an IP address in a routing table could significantly slow down the routers. Thus, in addition to particular IP addresses, routers can store entries that specify a range of IP addresses.

A range of addresses can be specified using a notation similar to that used to specify a single IP address. To specify a range of addresses, a mask length follows a particular address. The mask length identifies the starting bits or "network prefix" shared by addresses in the range of addresses. For example, a range of IP addresses may be expressed as "10.1.98.0/24", where the number after the "/" specifies a mask length of 24-bits (i.e., the "10.1.98" of the "10.1.98.49" address). Thus, "10.1.98.0/24" specifies a range of IP addresses that extends from "10.1.98.0" to "10.1.98.255". That is, "10.1.98.0" to "10.1.98.255" both have the same network prefix of "10.1.98.".

As shown in FIG. 1, the destination computer 110 of message 106 resides on a sub-network 104b of devices having IP addresses in the range specified by "10.1.98.48/29". Thus, different network routers may store a routing table entry for the range "10.1.98.48/29". Messages bound for the sub-network 104b eventually reach a gateway 109 that may store individual routing entries for IP addresses on the sub-network 104b. The gateway 109 is somewhat analogous to a local post office that collects mail for homes in a particular zip code before dispatching the mail to particular homes.

The message delivery scheme described above rests on an assumption that once assigned an IP address, a node does not move to a different sub-network. With the advent of mobile devices (e.g., laptop computers, wireless phones, and wireless PDAs (Personal Digital Assistants)), devices having IP addresses are increasingly likely to change their point of attachment while in use. FIGS. 2 and 3 illustrate a potential problem caused by this mobility.

FIG. 2 shows a wireless mobile node 110a attached to a sub-network 104b. As shown, the IP address of the mobile node 110a ("10.1.98.49") is within the range of IP addresses ("10.1.98.48/29") serviced by the sub-network 104b. As such, the sub-network 104b is referred to as the mobile node's 110a "home network" or "topologically correct sub-network". When the mobile node 110a remains at its home network 104b, the network 108 deliver messages 106 to the mobile node 110a as described in conjunction with FIG. 1.

In FIG. 3, however, the mobile node 110a has changed its point of attachment. For example, a user may have unplugged a laptop from a home network LAN (Local Area Network) 104b, brought their laptop on a flight across the country, and established a connection with a foreign sub-network 104c (i.e., a sub-network other than the home sub-network 104b). After this movement, however, the IP address of mobile node 110a is not within the range of IP addresses ("10.1.98.24/29") handled by the foreign sub-network 104c. As shown in FIG. 3, while network routers continue to forward messages 106 destined for the mobile node 110a to the node's 110a home network 104b, the mobile node 110a is no longer on the home network 104b. In these circumstances, the home network 104b will typically drop messages 106 addressed to the mobile node 110a.

Several solutions to problems posed by mobile network nodes have been developed. For example, FIG. 4 illustrates a registration process used in mobile IP systems. In the registration process, a mobile node 110a notifies a foreign agent 112 of the node's 110a presence on the foreign network 104c. The foreign agent 112, in turn, notifies a home agent 114 on the mobile node's 110a behalf. Registration fails if communication with the home agent 114 fails.

If registration succeeds, upon receipt of a message 106 addressed to the mobile node 110a, the home agent 114 tunnels the message 106 to the foreign agent 112. Tunneling is much like taking an entire envelope and stuffing it into yet another envelope addressed to a different street address. The foreign agent 112, in turn, de-tunnels and forwards the messages to the mobile node 110a.

BRIEF SUMMARY OF THE INVENTION

The invention enables hosts that do not share a network prefix to communicate in the event the hosts are unable to communicate with a router. The invention, thus, can preserve some measure of communication where a host is unable to communicate with a home or foreign agent.

Advantages will become apparent in view of the following description, including the figures and the claims.

DETAILED DESCRIPTION

A home and foreign agent can cooperate to deliver messages to a mobile node as the mobile node changes its point of attachment to a communication network. Sometimes, however, communication between the foreign and home agents may fail, for example, due to problems at the home agent or routers carrying messages between home and foreign agents. In such circumstances, the mobile node may find itself isolated and unable to receive IP (Internet Protocol) addressed messages. A variety of techniques, described below, can enable a mobile node to continue receiving IP addressed messages from other network nodes even when the mobile node fails to establish, or loses, connectivity with a home agent. In addition to preserving incoming message delivery, the techniques may place minimal, if any, burden on network resources.

Establishing Local and Remote Bindings

Figure 1:
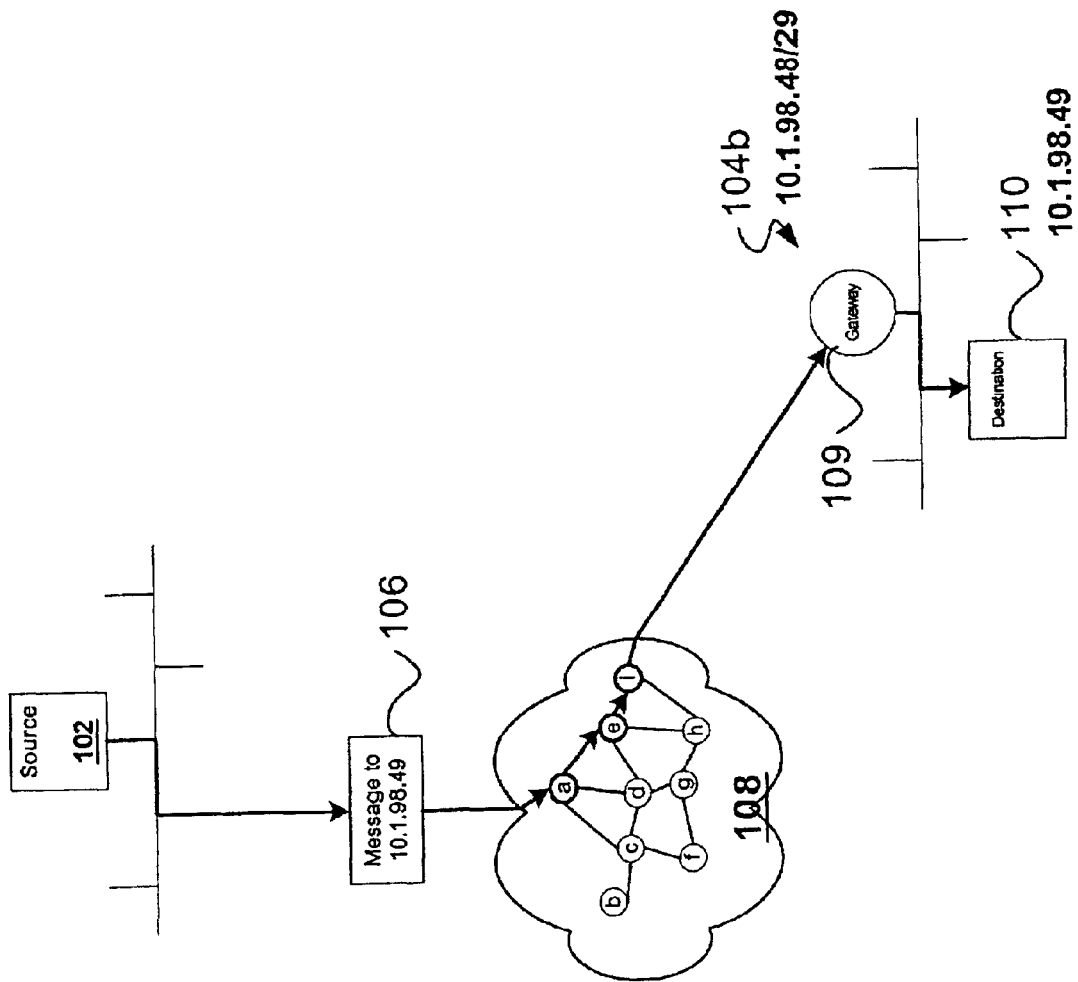
FIGS. 1–4 are diagrams illustrating network delivery of a message to a mobile node.
Figure 2:
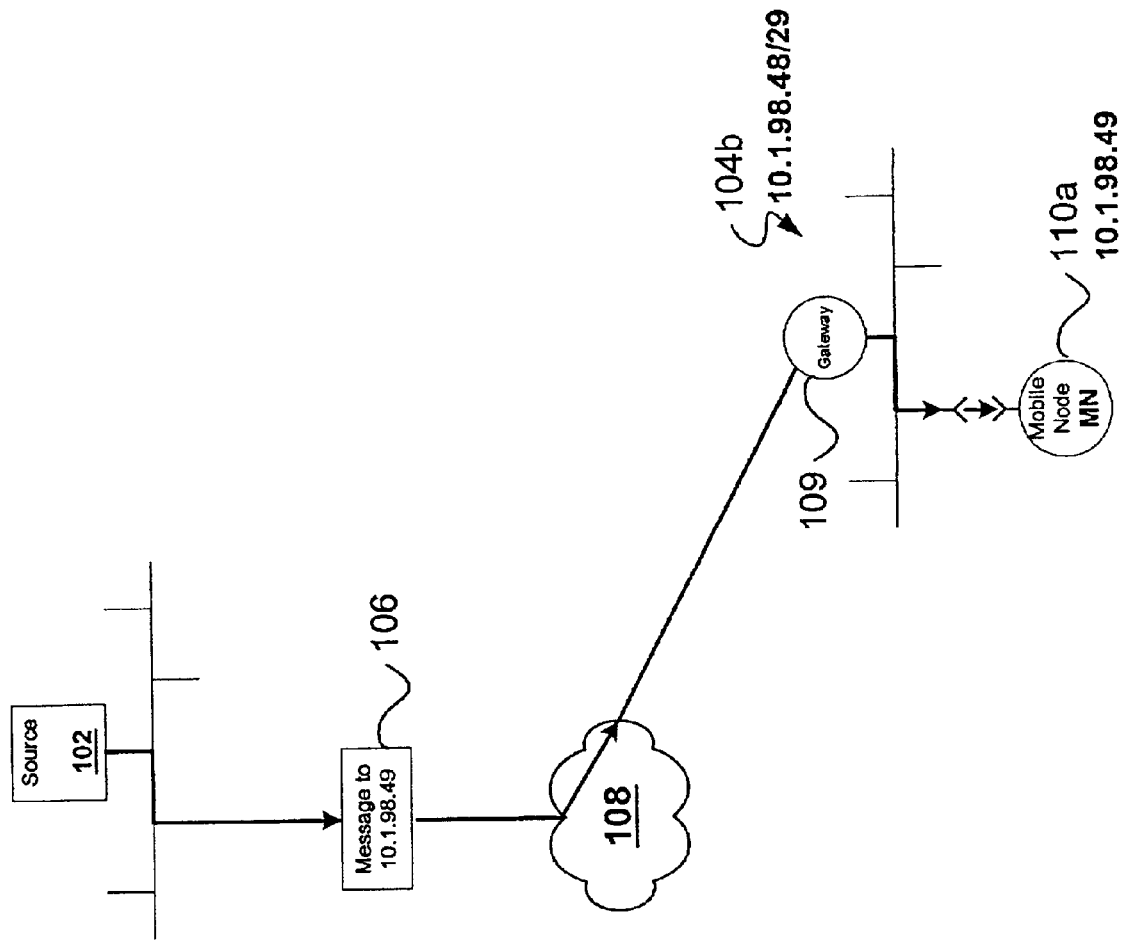
Figure 3:
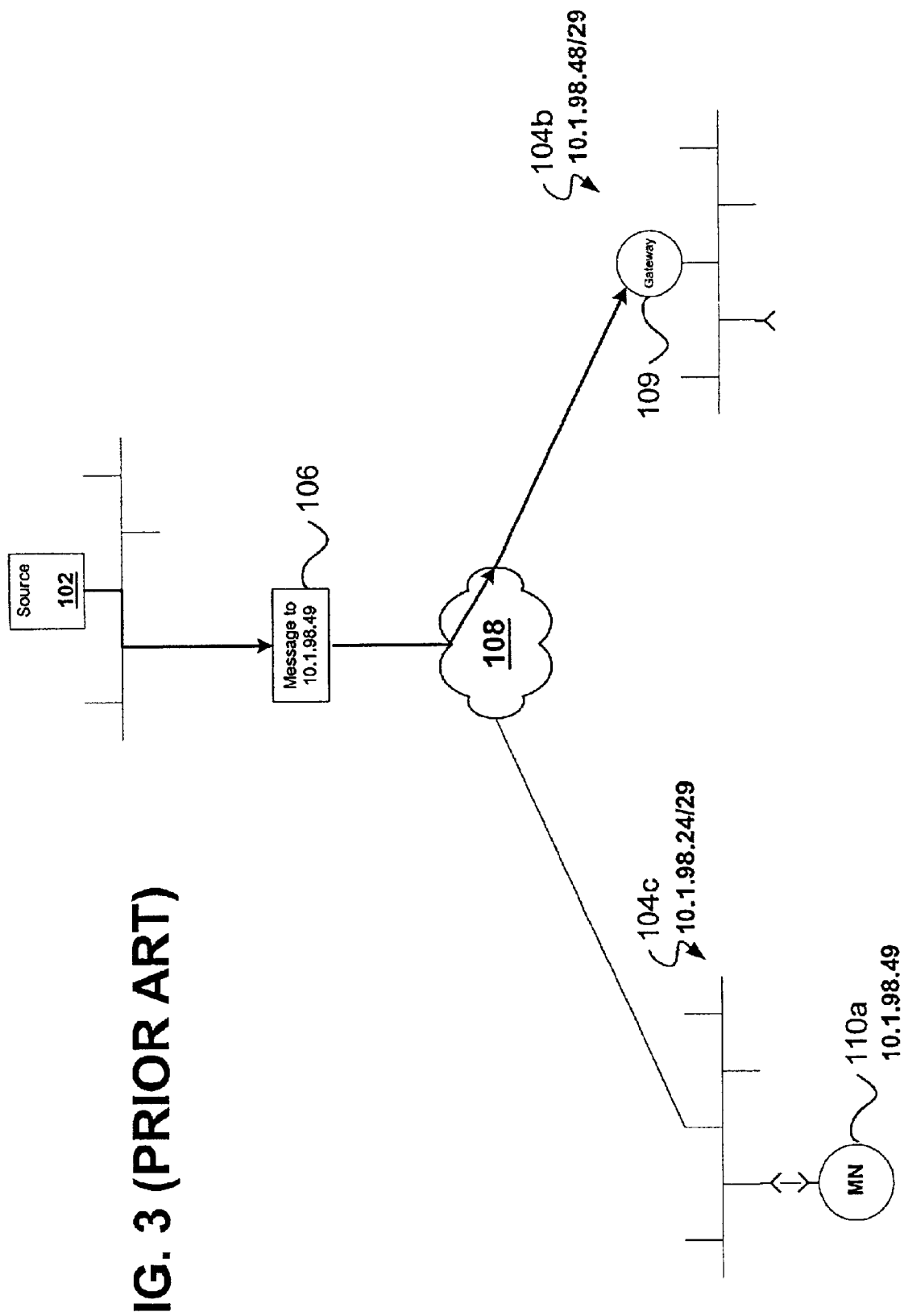
Figure 4:
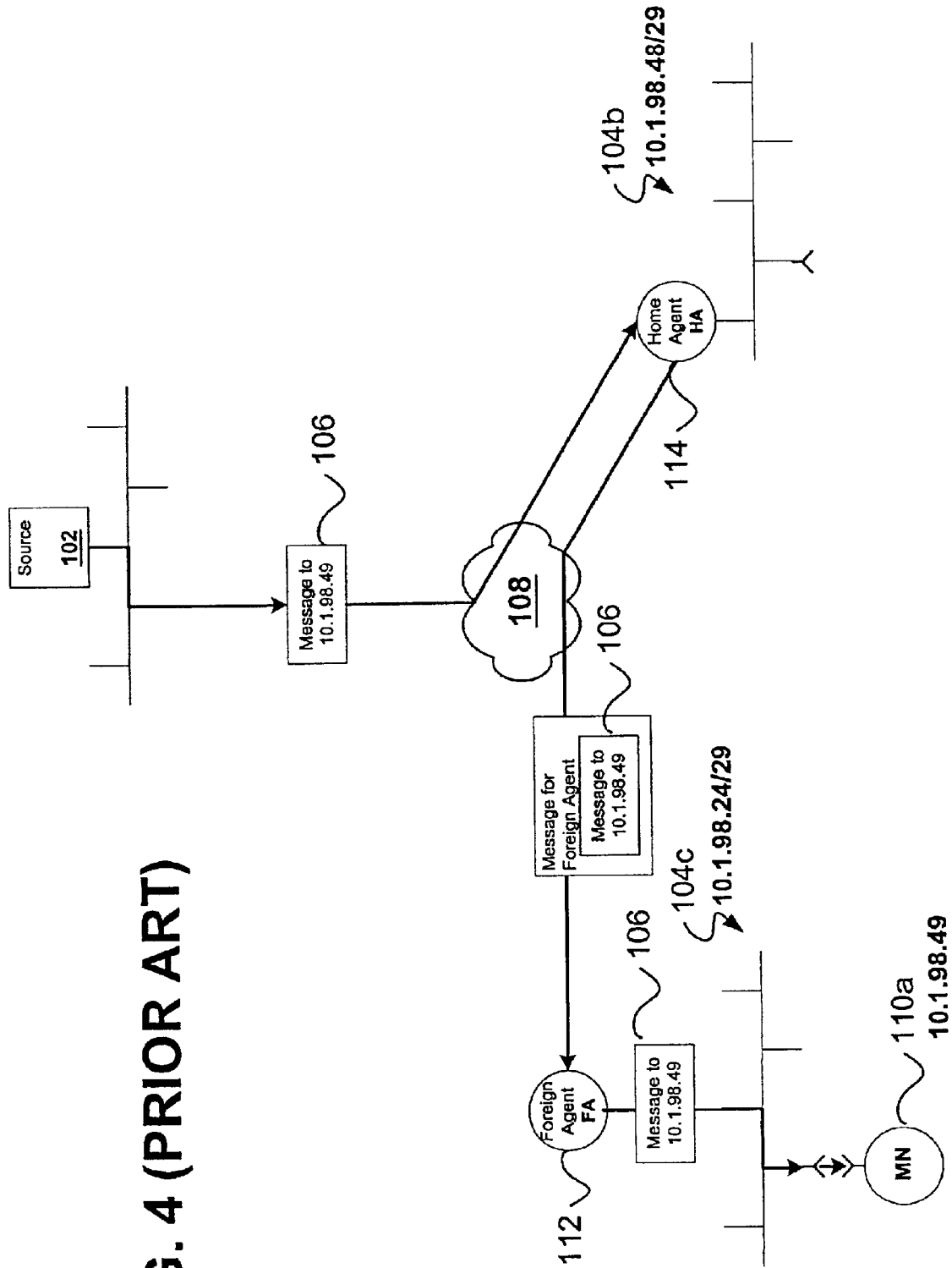
Figure 5:
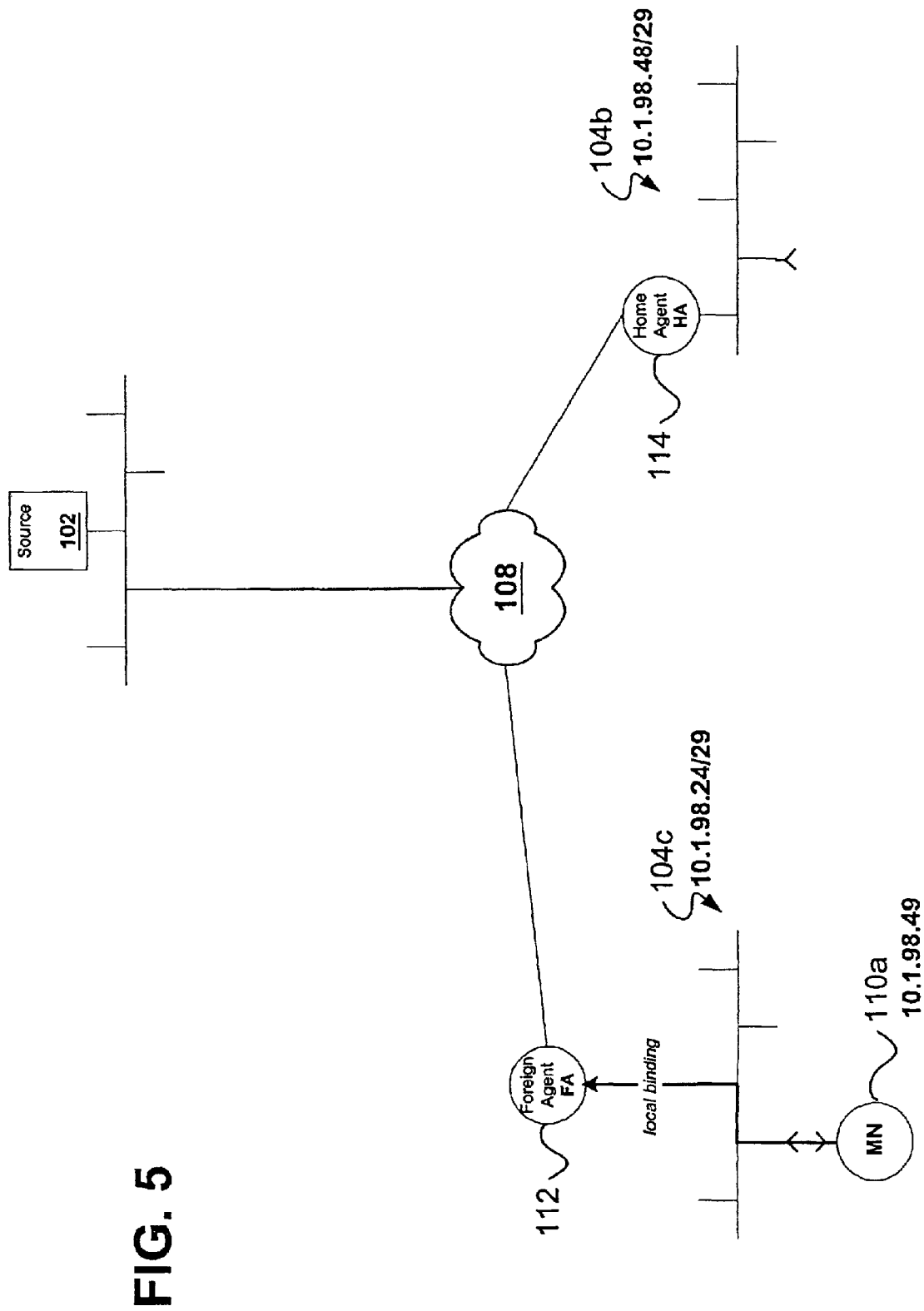
FIGS. 5–6 are diagrams illustrating establishment of local and remote bindings.
Figure 6:
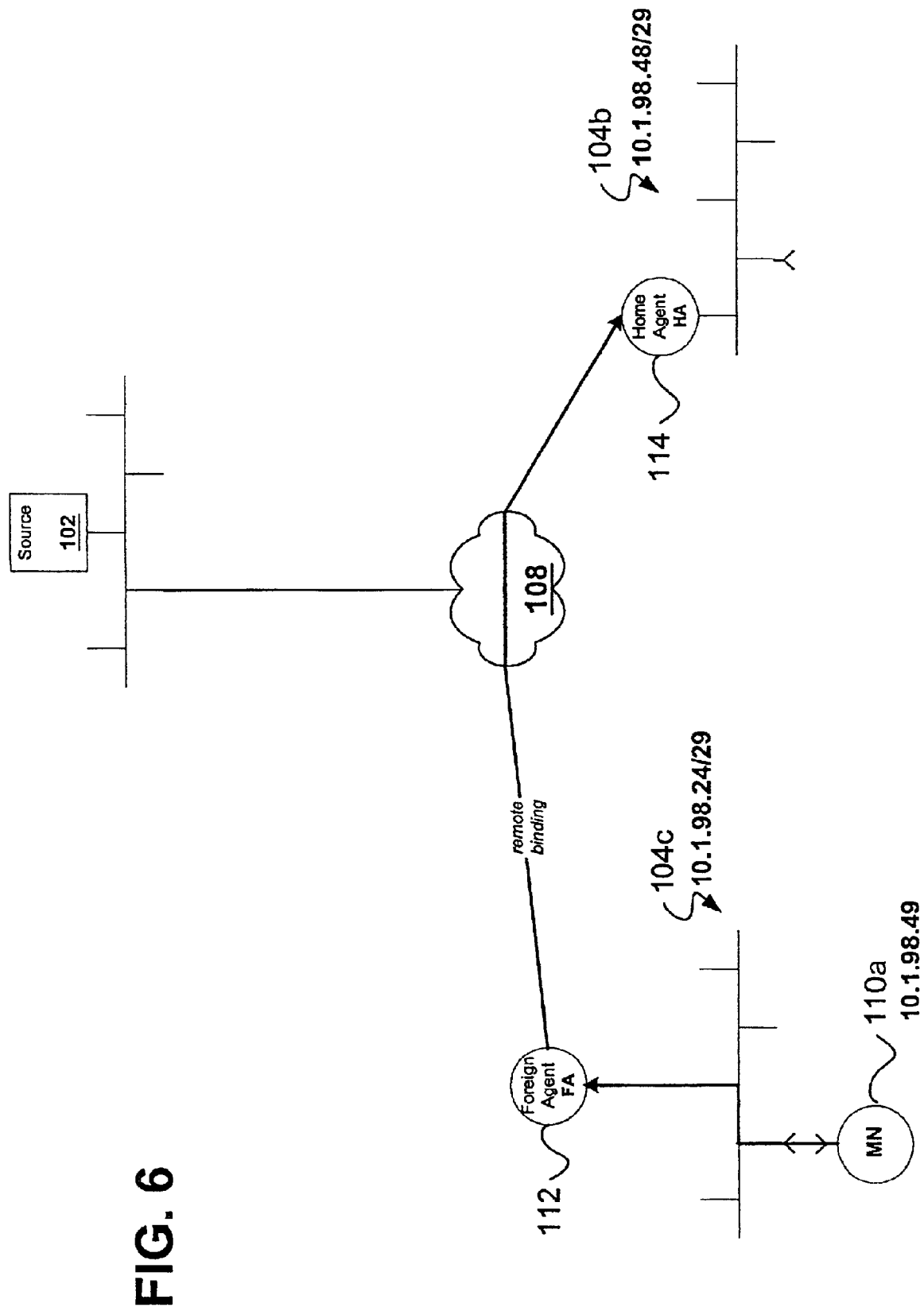

FIGS. 5 and 6 illustrate an approach that separates the task of establishing communication with a foreign agent 112 from the task of establishing a home agent 114. As described below, establishment of a foreign agent can play a part in message delivery even if an attempt to establish communication with a home agent fails.

As shown in FIG. 5, a mobile node 110a has established a local binding with a foreign agent 112 on a foreign sub-network 104c. The process of establishing a local binding between a foreign agent 112 and mobile node 110a may proceed in a variety of ways. For example, the foreign agent 112 may send a message to a multicast address declaring its availability. This message can include information such as the services the foreign agent offers (e.g., reverse tunneling) and information about planned outages, capacity, and so forth. When a mobile node 110a establishes a link layer connection to a foreign sub-network 104c, the mobile node 110a can await messages sent to the multicast address by the foreign agent 112. Upon receipt of such a message, the mobile node 110a may send the foreign agent 112 the mobile node's 110a IP address and a link layer address (e.g., an address that identifies the endpoint of a physical link between the foreign agent 112 and the mobile node 110a). The foreign agent 112 can create a routing table entry for the mobile node's 110a IP address and link layer address and, thereafter, deliver messages addressed to the mobile node's 110a IP address using the corresponding link layer address. The process described is one example of the creation of a local binding between the mobile node 110 and the foreign agent 112.

As shown in FIG. 6, after establishing a local binding with a foreign agent 112, the mobile node 110 can attempt to send its IP address and the IP address of its foreign agent 112 to a home agent 114. This can establish a remote binding between the mobile node 110a and the home agent 114. Thereafter, the home agent 114 can tunnel messages received at the mobile node's 110a home network 104b to the mobile node's 110a foreign agent 112 for de-tunneling and delivery to the mobile node 110a.

While FIG. 6 shows successful establishment of a remote binding with the mobile node's 110a home agent 114, the mobile node's 110a local binding with its foreign agent 112 can remain intact even if the attempt to establish a remote binding fails. This permits varying degrees of message delivery to continue even though communication with a home agent 114 is interrupted or fails from the outset.

Figure 7:
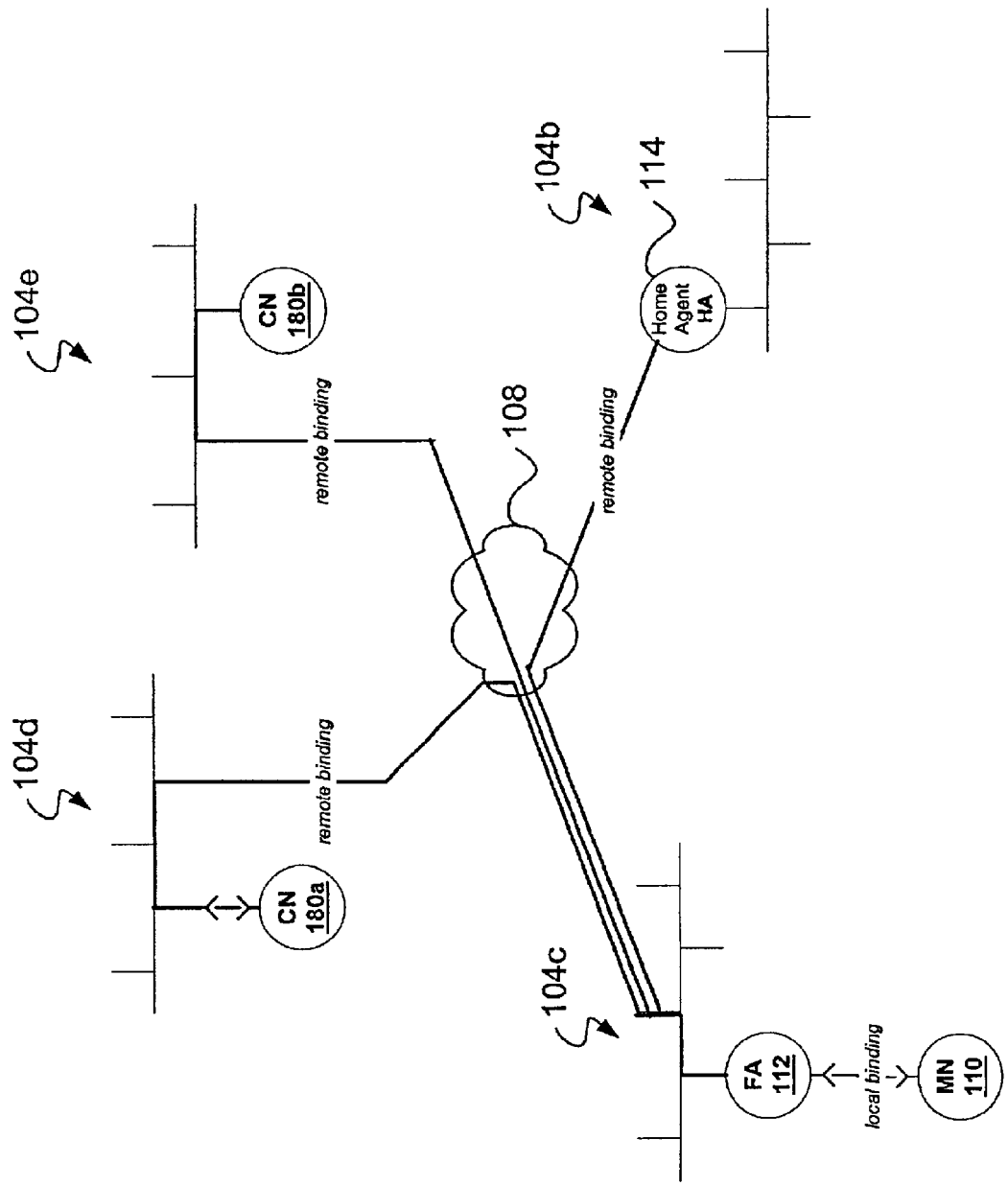
FIG. 7 is a diagram illustrating multiple remote bindings established by a mobile node.

As shown in FIG. 7, in addition to, or as an alternative to, establishing a remote binding with a home agent 114 on the mobile node's 110a home network 104b, a mobile node 110a can establish remote bindings with one or more nodes 180 ("correspondent nodes") on foreign sub-networks. For example, as shown in FIG. 7, the mobile node 110a has established a remote binding with foreign sub-network nodes 180a and 180b in addition to a remote binding with a home agent 114 on the mobile node's 110a home sub-network.

Establishment of a remote binding with a node 180 on a foreign sub-network can occur without the involvement or establishing communication with a home agent 114. For example, when the mobile node 110a sends a message to a correspondent node 180a and expects a reply, the mobile node 110a can also send the node 180 the mobile node's IP address and the IP address of its foreign agent 112. Thereafter, a correspondent node 180a can tunnel messages to the mobile node's 110a foreign agent 112 for de-tunneling and delivery to the mobile node 110a. The tunneled message need not pass through any part of the mobile node's 110a home network 104b. This may not only reduce message delivery time by eliminating a routing detour to the mobile node's 110 home agent 114, but permits message delivery to a mobile node in the absence of communication with a home agent 114.

Figure 8:
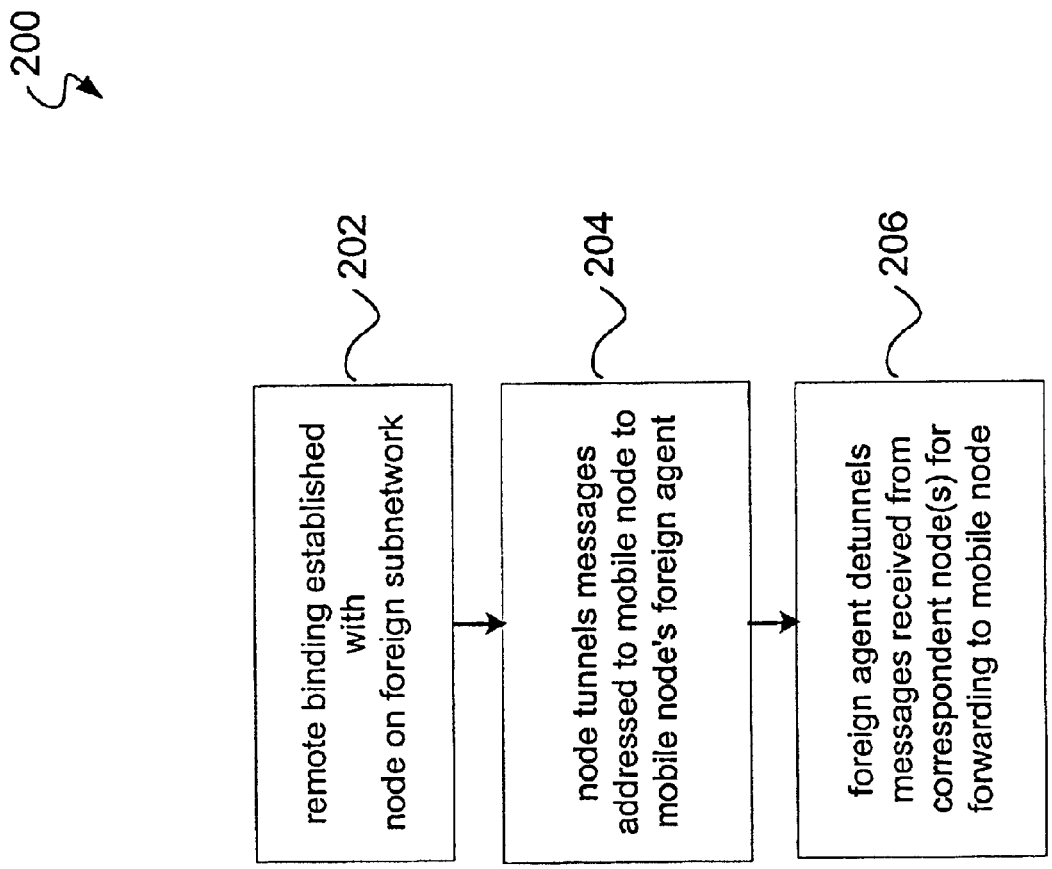
FIG. 8 is a flow-chart of a process for establishing multiple remote bindings.

FIG. 8 depicts a flow-chart 200 describing an example of a process for establishing a remote binding with a node on a foreign sub-network. As shown in FIG. 8, a mobile node, or another node having knowledge of the mobile node's IP address and the IP address of the mobile node's foreign agent, may initiate establishment (step 202) of a remote binding for the mobile node. For example, a router having a remote binding with a mobile node may receive a message addressed to the mobile node. In such a case the router can establish a remote binding with the message sender on behalf of the mobile node. Thereafter, regardless of the entity initiating establishment of a remote binding, the sender can tunnel (step 204) messages directly to the mobile node's foreign agent for subsequent delivery (step 206) to the mobile node. Again, this process does not require communication with the mobile node's home agent.

Publishing Node Information

FIGS. 9 to 13 illustrate other techniques that can enable a mobile node to continue to receive IP messages from other network nodes in the absence of communication with a home agent. Essentially, each foreign agent publishes information about currently attached mobile nodes to other foreign agents and/or other routers. Routers/agents receiving the information can, for example, create routing table entries for the mobile nodes. When a foreign agent or other router receives a message addressed for delivery to a mobile node, the foreign agent or router can tunnel the message to the mobile node's foreign agent. The foreign agent, in turn, de-tunnels the message for delivery to the mobile node.

Such a scheme poses an important question: which foreign agents/routers should receive information about the mobile nodes? For example, publishing the local bindings of a foreign agent to each router on the Internet could generate an overwhelming amount of network traffic and could result in enormous routing tables. One solution involves programming each foreign agent or router with a complete or partial list of other routers/agents that should receive the information. For example, a collection of routers/agents that share such information ("a mobility region") can be handcrafted by selecting network nodes for inclusion in the region and programming agent/routers in the region accordingly. In another approach, however, the mobility region may coincide with nodes in an autonomous system.

In greater detail, the Internet knits together many different autonomous systems. The term autonomous system does not denote a geographic relationship, but instead identifies an administratively defined region of routers that share information about the configuration of nodes (i.e., the topology) within the system. This information enables the routers in the autonomous system to determine a path for a message having a given destination network address. For example, many autonomous systems use a protocol known as OSPF (Open Short Path First) to route messages. In OSPF, each router floods the autonomous system with "link state advertisements" describing a metric (e.g., a time delay or link capacity) associated with reaching routers adjacent (i.e., within one "hop" or link) to itself. Each router in the autonomous system eventually receives information about costs associated with each connection ("link") in the system. From received link state advertisements, a router can determine the current topology of the autonomous system and can identify paths through the set of routers that reach particular nodes or sub-networks. Other autonomous systems can use other routing protocols such as distance vector routing protocols.

Figure 9:
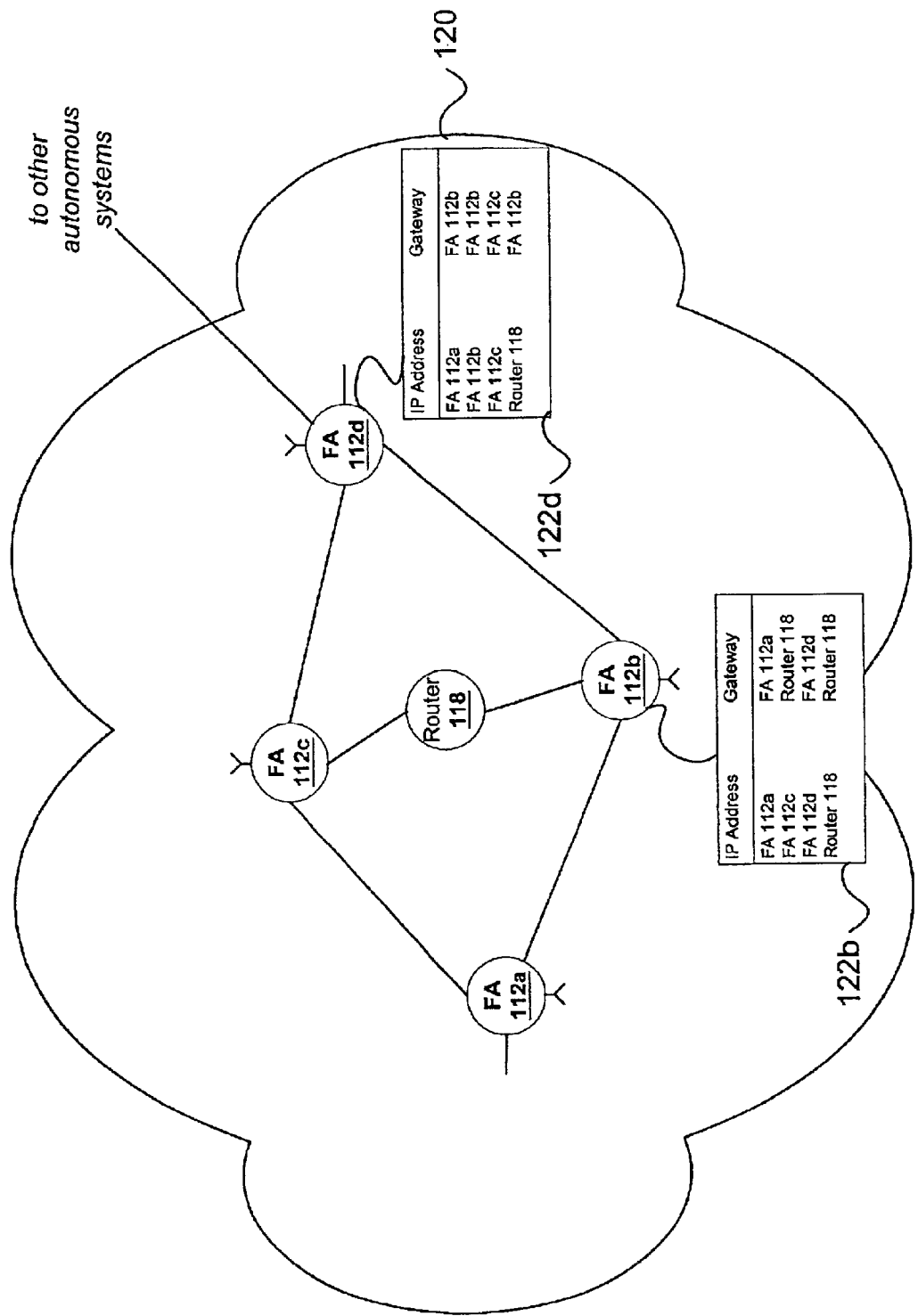
FIGS. 9–11 are diagrams illustrating publication of mobile node information.

FIGS. 9 to 13 illustrate how publishing information about locally bound mobile nodes can enable message delivery to the nodes when communication with a home agent is not available. As shown in FIG. 9, a foreign agent router 112d maintains a routing table 122d indicating how to route messages bound for different nodes in a region 120 (e.g., an autonomous system). As shown, the routing table 122d lists an IP address and an adjacent router (i.e., a router one "hop" or "link" away) en route to the listed IP address. For example, the routing table 122d indicates that a message bound for foreign agent 112a should be forwarded to foreign agent 112b. Similarly, the routing table 122b for foreign agent 112b, instructs the foreign agent 112b to forward the message to foreign agent 112a.

Figure 10:
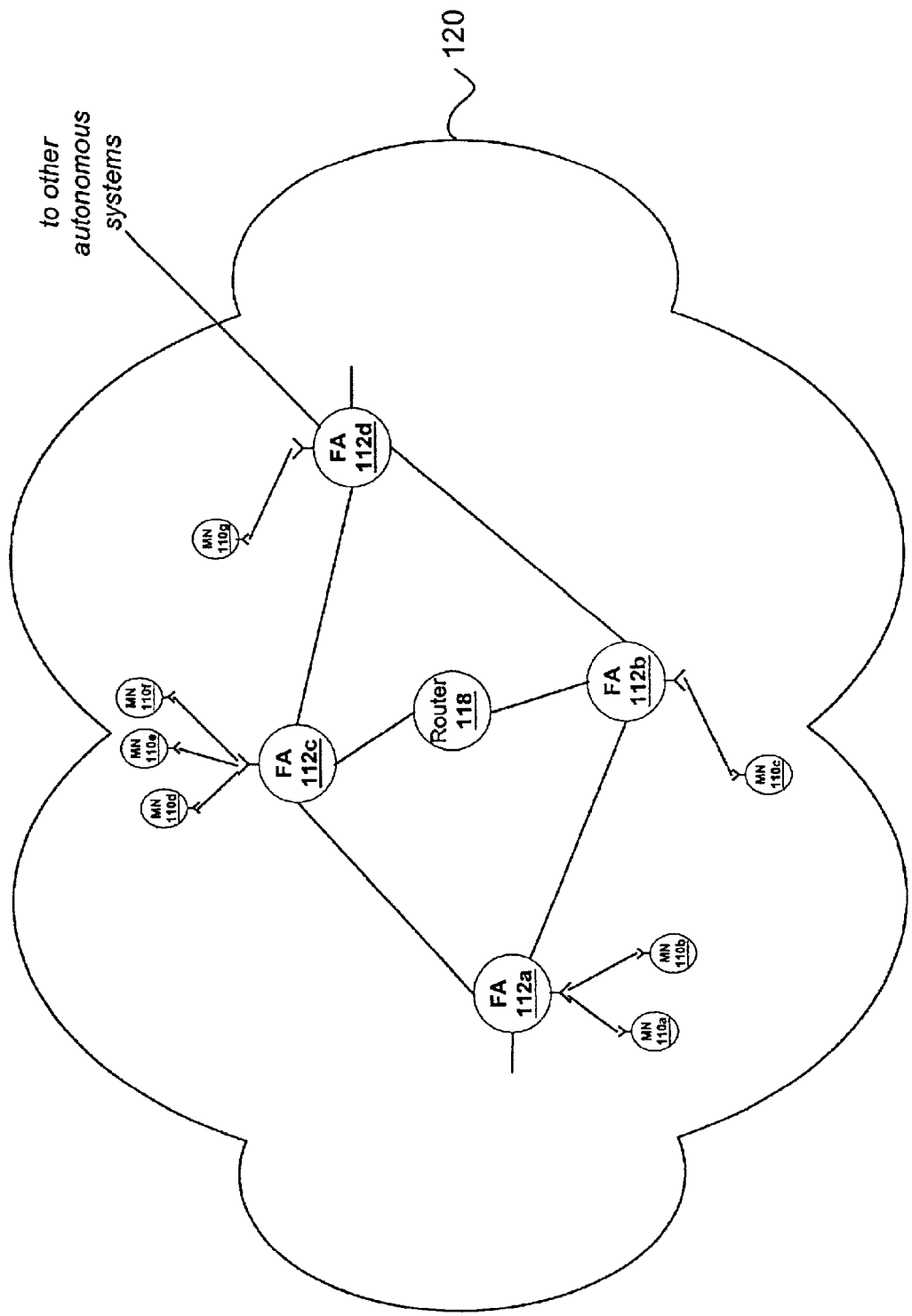

As shown in FIG. 10, mobile nodes 110 may establish local bindings with foreign agents 112a–112d in the region 120. To inform and update region routers 112a–112d, 118 of these local bindings, each foreign agent 112a–112d can publish information describing locally bound mobile nodes. Publishing may be performed in a variety of ways.

Figure 11:
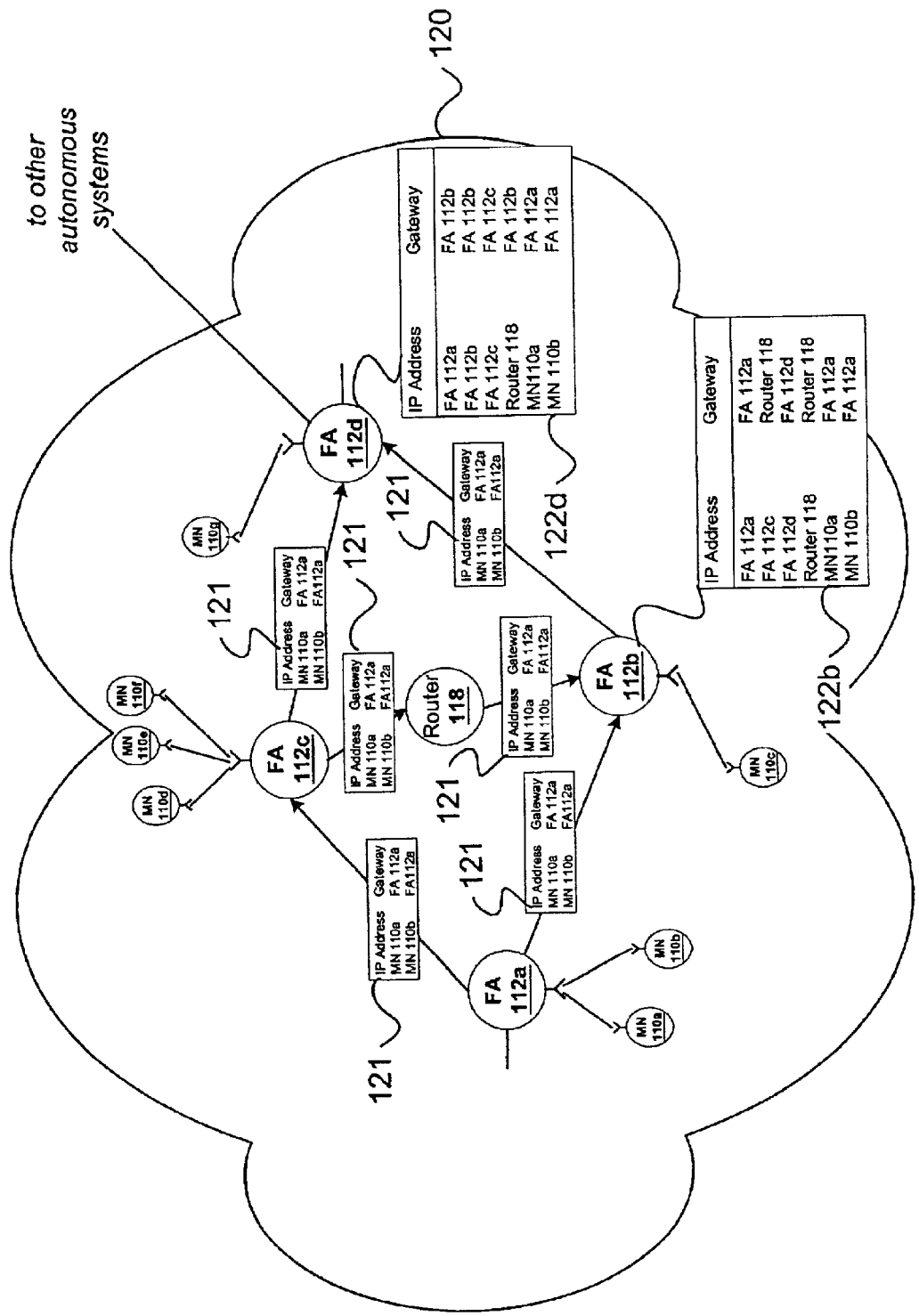

For example, FIG. 11 illustrates publishing by flooding. Flooding, in turn, may be done in a variety of ways. For example, an initial router 112a can publish information 121 about locally bound nodes 110a–110g to each adjacent router (e.g., 112c, 112b). Routers receiving the information 121 for the first time can forward the information 121 to each adjacent router other than the router it received the information 121 from. Routers receiving the information 121 a second time can drop the information 121. As shown, flooding can quickly spread mobile node information 121 across the region 120. Though FIG. 11 only shows flooding initiated by one foreign agent 112a, each foreign agent 112a–112d can flood a region 120 with information about locally bound mobile nodes 110a–110g. Thus, each area router/agent 112a–112d, 118 can locate a mobile node's 110a–110d foreign agent 112a–112d. The agents/routers 112a–112d, 118 can add entries for each mobile node 110a–110g to their routing tables 122b, 122d. For example, foreign agent 122d can create a routing table 122d entry for mobile nodes 110a and 110b.

Messages transmitted by a foreign agent 112a–112d to publish information of locally bound nodes 110a–110g may use a variety of data formats. Alternatively, such information can be included in messages normally exchanged by routers (e.g., OSPF opaque link state advertisements). Such messages need not include metric information describing the state of links between region routers/agents or other information for routing packets through the network, but may only include identification of a foreign agent 112a–112d and one or more mobile nodes 110a–110g locally bound to the foreign agent 112a–112d. Such messages should be coded such that their use does not interfere with operating routing protocols. Routers not participating in the scheme can ignore the content of the message.

Figure 12:
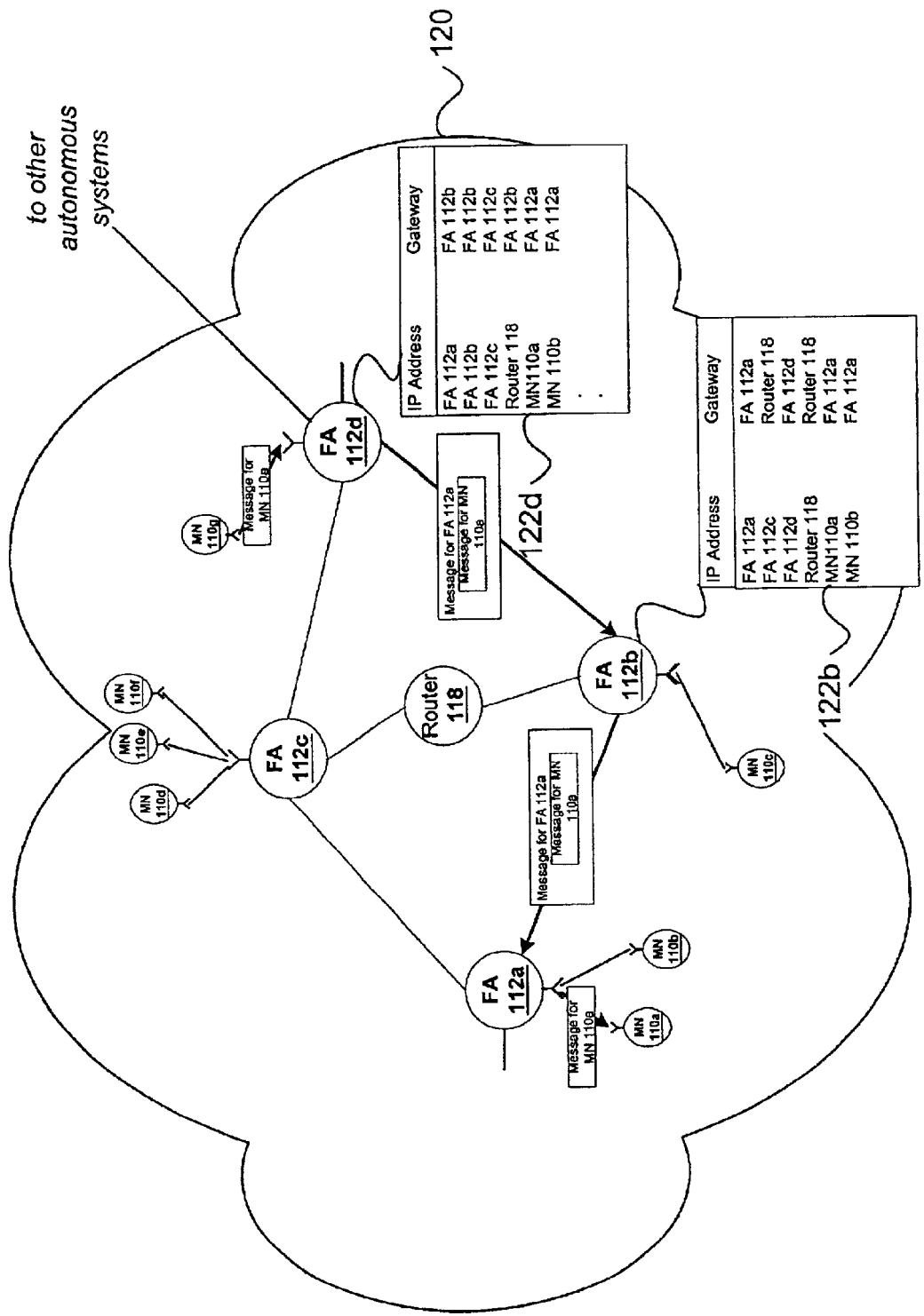
FIG. 12 is a diagram illustrating delivery of a message to a mobile node.

As shown in FIG. 12, because of the publication of mobile node information, region routers 112a–112d, 118 can deliver messages using the IP address of a mobile node 110a–110g, without the intervention of a mobile node's home agent. For example, in FIG. 12, mobile node 110g addresses a message to mobile node 110a. Upon receipt of the message, foreign agent 112d looks up a routing table 122d entry for mobile node 110a, and initiates tunneling of the message to the foreign agent 112a of the destination mobile node 110a. Tunneling enables delivery of the message even though intervening routers may not participate in the scheme. The foreign agent 112a of the destination mobile node 110a de-tunnels the tunneled message and forwards the de-tunneled message to the mobile node 110a. Again, this enables mobile nodes 110a–110g in the area 120 to communicate using IP addresses even though a connection to a home agent may fail.

As illustrated, though messages received by a mobile node's 110a–110g foreign agent 112a–112d may be tunneled, the publishing information need not be tunneled. This can increase efficiency.

As mobile nodes move about, foreign agents 112a–112d may publish updated information. For example, after a mobile node 110a terminates a local binding with an agent 112a, the agent 112a may flood the region 120 with a message indicating the agent 112a no longer offers link layer (i.e., physical connectivity) with the node 110a. A similar flooding may occur after a node 110a establishes a new local binding. Additionally, agents 112a–112d may periodically flood information regardless of whether mobile nodes establish or terminate connections.

Figure 13:
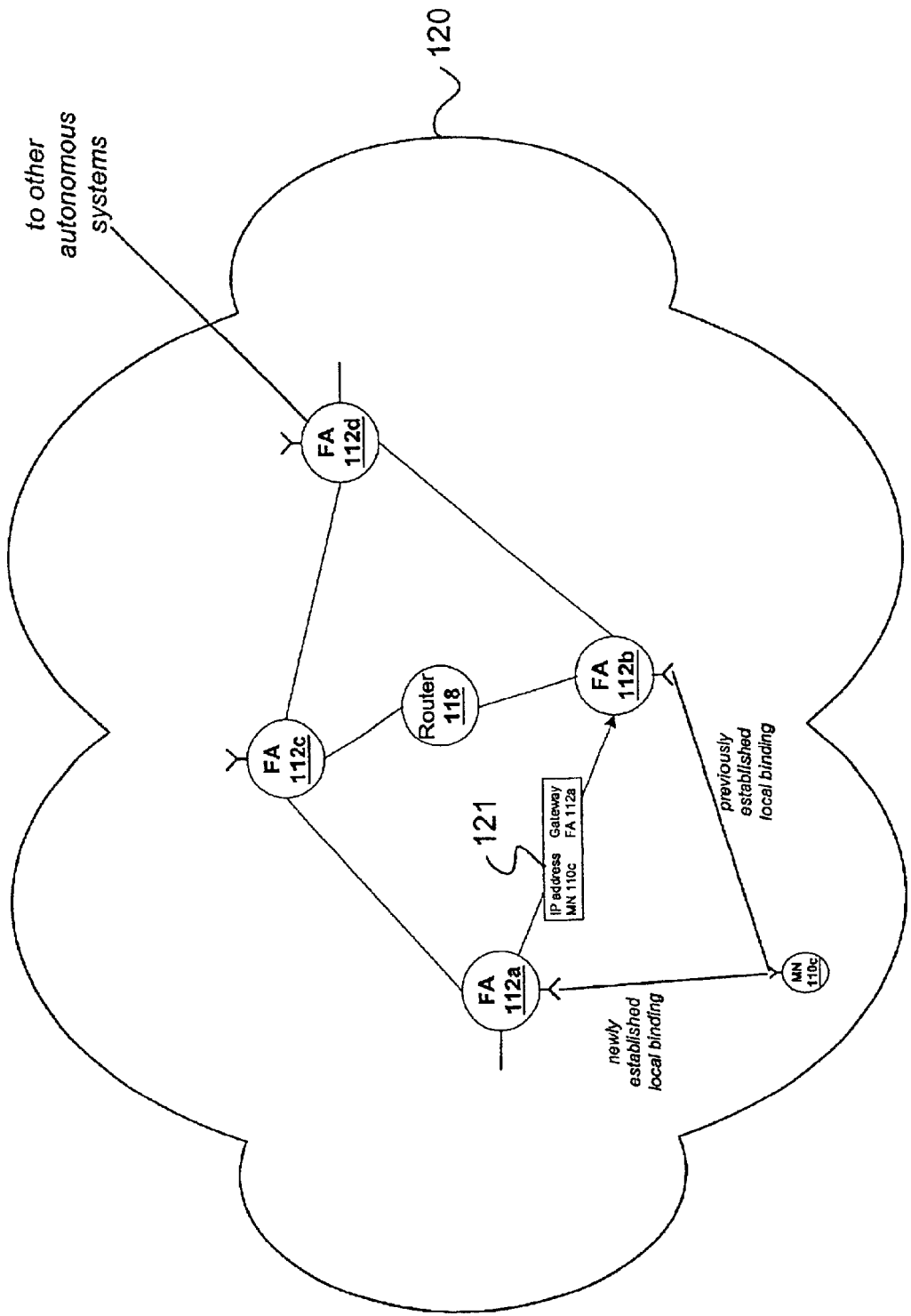
FIG. 13 is a diagram illustrating movement of a mobile node.

As shown in FIG. 13, a mobile node 110c may be capable of communicating with more than one foreign agent 112a, 112b. In fact, in some implementations, a mobile node 110c ranks foreign agents 112a, 112b in physical communication and establishes a local binding with the highest ranking agent. Such ranking may be based, for example, on services offered by the agents, capacity, signal strength, and so forth. The mobile node 110c may periodically repeat the ranking process. This can enable the mobile node 110c and routers to adapt to changes in network conditions and the mobile node's locations.

As shown in FIG. 13, mobile node 110c establishes a local binding with foreign agent 112a after having previously established a local binding with foreign agent 112b. As shown, the local binding may trigger publishing of information 121 about the mobile node's 110c new local binding. Such publishing may only be initiated after some holdoff time period (e.g., a few seconds) after initiating a previous publishing. The technique can enable a router to combine the information about mobile nodes into fewer messages.

Thus, as shown in FIG. 13, a mobile node 110c may have local bindings with two foreign agents 112a, 112b at the same time. Further, a foreign agent 112b having a local binding with a mobile node 110c may receive a published message 121 initiated by a different foreign agent 112a also having a local binding with the mobile node 110c. To ensure continuous service, a foreign agent 112 may give precedence to a local binding over a published local binding. That is, until the mobile node 110c terminates its local binding with foreign agent 112b, foreign agent 112b will disregard published local binding messages for the node 110c and continue to deliver messages directly to mobile 110c, instead of tunneling them to foreign agent 112a.

Figure 14:
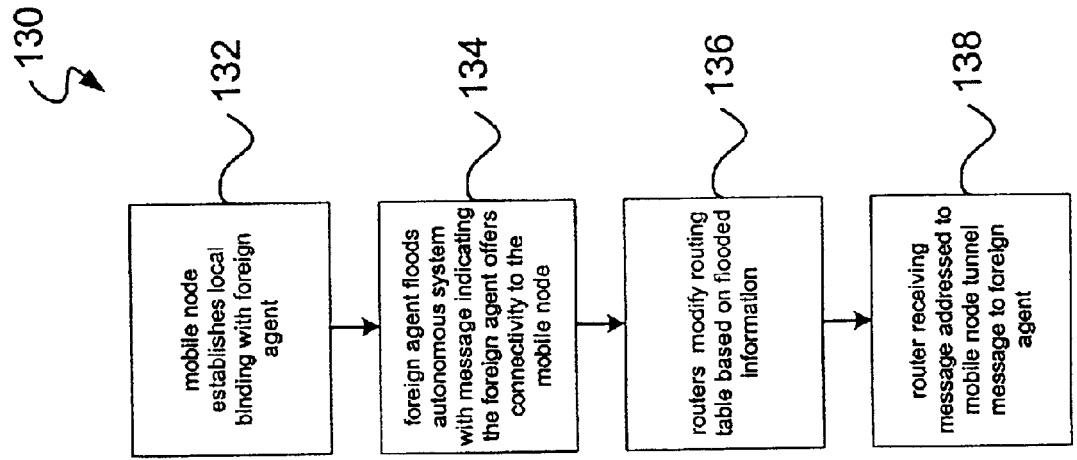
FIG. 14 is a flow-chart of a process for transmitting mobile node information.

FIG. 14 shows a flow-chart of a process 130 for publishing mobile node information in a region. In this example process, after a mobile node (step 132) establishes a local binding with a foreign agent, the foreign agent floods (step 134) area routers with a message describing a local binding with the mobile node. Routers receiving the message can update (step 136) their routing tables correspondingly. Thereafter, the routers can tunnel (step 138) messages to the mobile node without intervention of a home agent.

Again, sharing mobile node attachment information between routers in an area (or other defined set of routers) permits IP-based message delivery to mobile nodes without requiring the assistance of a home agent. Additionally, the technique permits IP-based message delivery to mobile nodes even in the event the entire area loses connectivity with any other region. That is, even if a communication link goes down, mobile nodes in a region can continue to exchange messages.

Routing Messages Between Nodes on a Foreign Sub-Network

Sharing the locations of mobile nodes between routers in a region can help provide IP-based message delivery without home agent intervention. Sometimes, however, communication between routers in an area may also suffer. For example, many networks feature mobile routers such as routers carried by planes or satellites. In such an environment, the mobile routers may be unavailable for periods of time.

Figure 15:
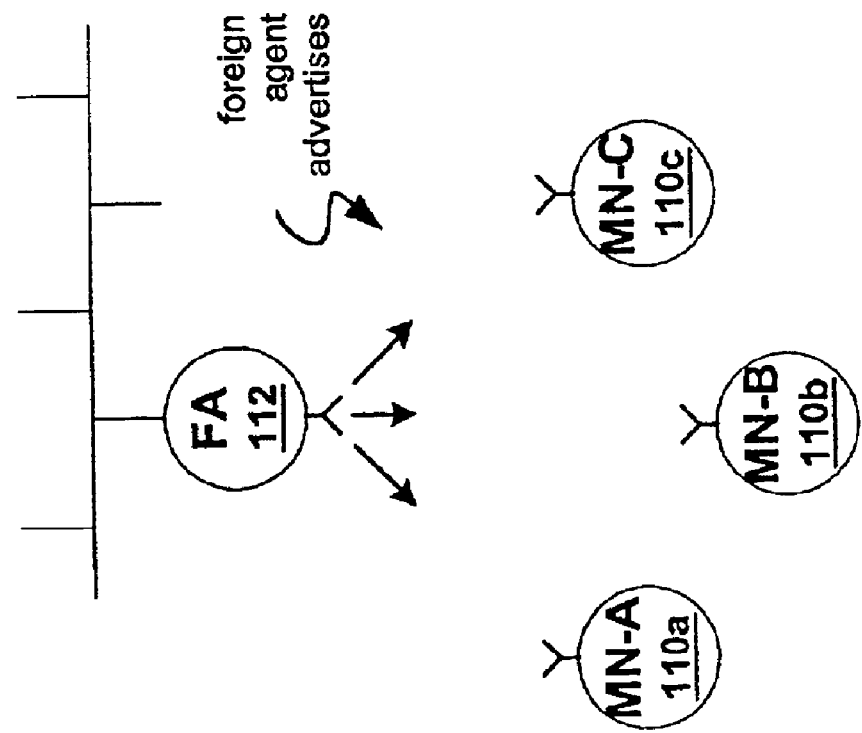
FIGS. 15 to 17 are diagrams illustrating delivery of messages between mobile nodes sharing a foreign agent.
Figure 16:
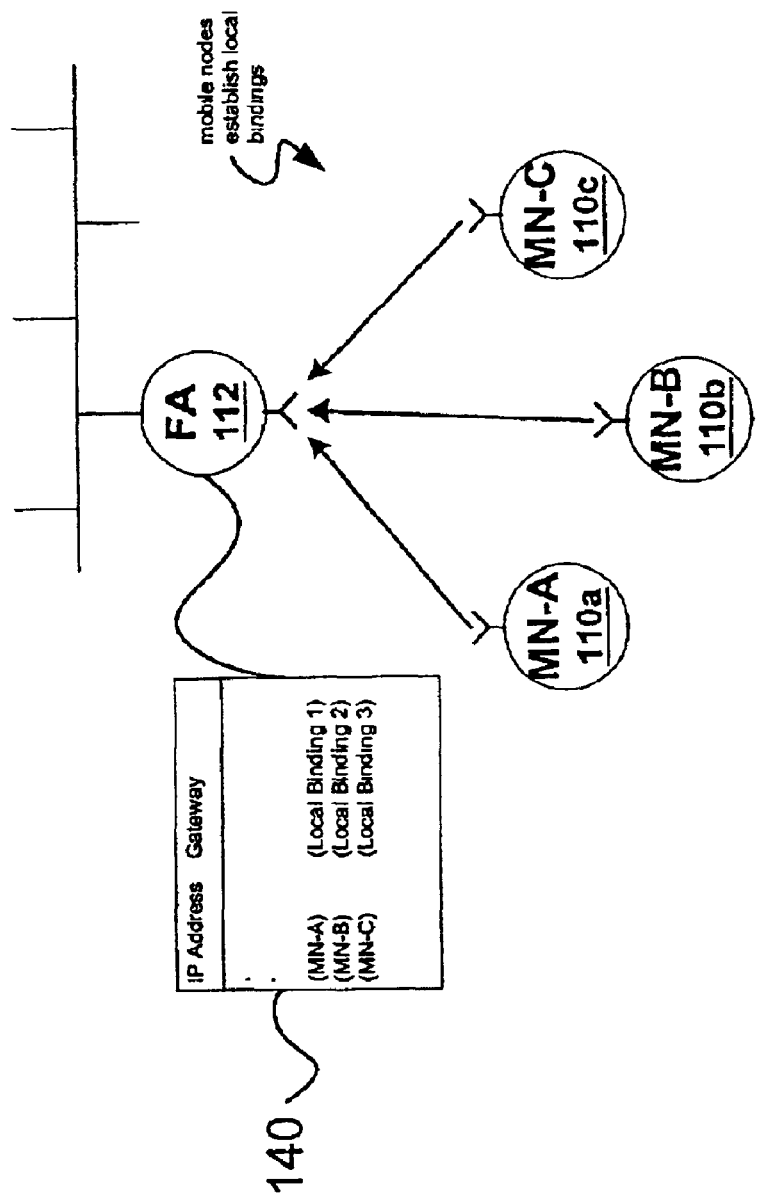
Figure 17:
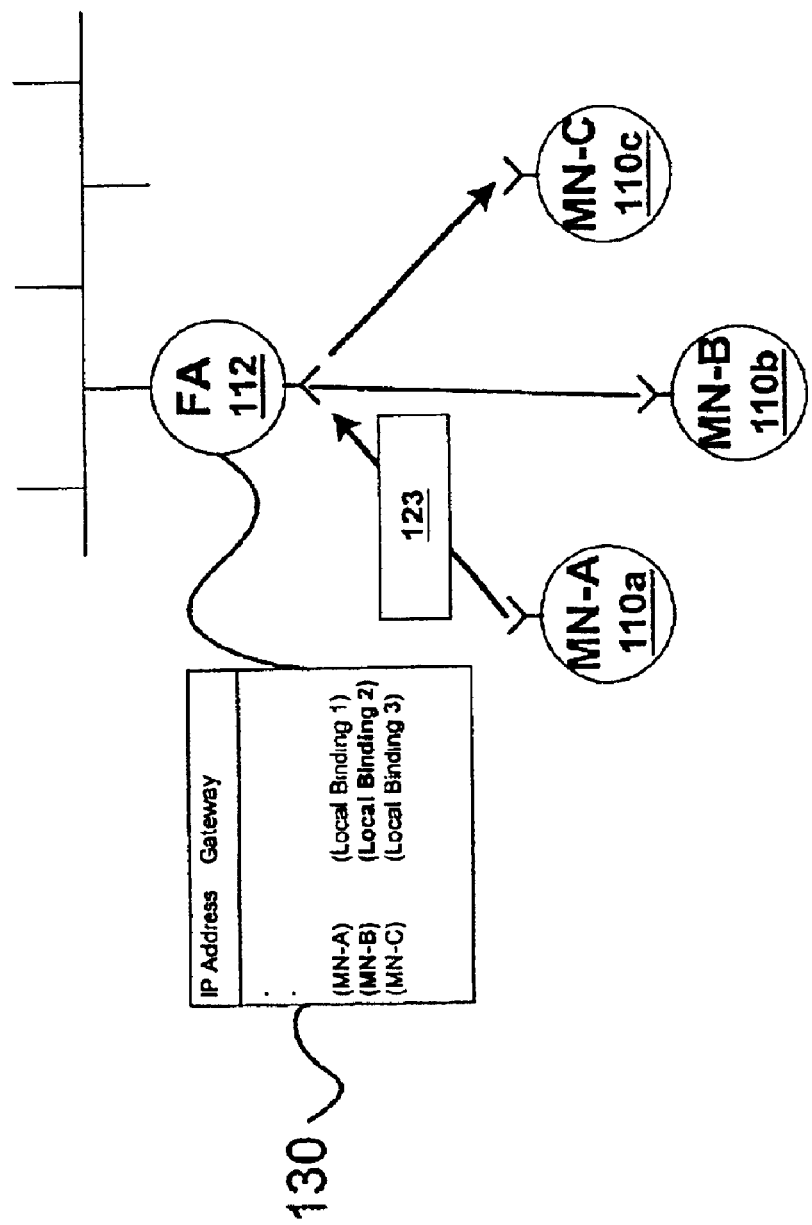

FIGS. 15 to 17 illustrate a technique for providing message delivery to mobile nodes sharing a foreign agent. Thus, even in the event a foreign agent becomes isolated from other routers, mobile nodes sharing the foreign agent can continue to exchange messages.

As shown in FIG. 15, a foreign agent 112 periodically sends a message declaring the agent's 112 availability for providing service to mobile nodes 110a–110c. As shown in FIG. 16, after the mobile nodes 110a–110c respond, the foreign agent 112 can modify a routing table 140 to include entries for the mobile nodes 110a–110c. These entries can include the IP address of a mobile node 110a–110c and the node's link layer address (e.g., MAC (Media Access Control) Address). Thus, as shown in FIG. 17, when the foreign agent 112 receives an IP message 123 addressed to another mobile node 110c having a local binding with the same foreign agent 112, the foreign agent 112 can send the message to the destination node 110 directly; without the use of the destination node's home agent or any other routers in an area. For example, as shown, the foreign agent 112 can receive an IP message 123 from mobile node A 110a addressed to mobile node C 110c and can send the message to mobile node C using the link layer address stored in the routing table 130.

Figure 18:
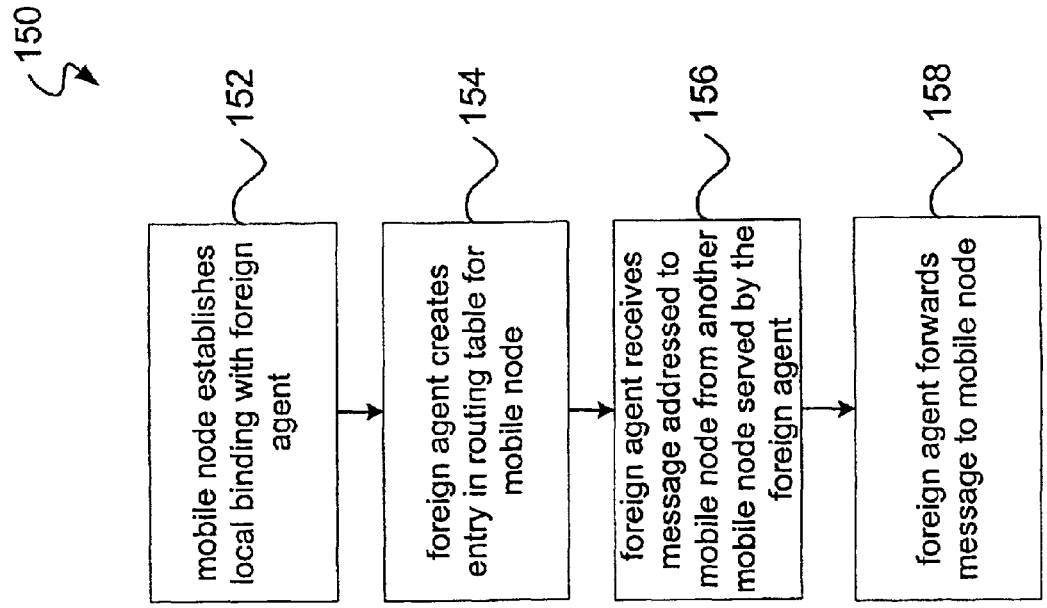
FIG. 18 is a flow-chart of a process for delivering messages between mobile nodes sharing a foreign agent.

FIG. 18 illustrates a process 150 for delivering messages between mobile nodes sharing a foreign agent. After a mobile node establishes (step 152) a local binding with a foreign agent (or the mobile node otherwise communicates its IP address and link layer information), the foreign agent can modify (step 154) a routing table to include information about the mobile node. Thereafter, when the foreign agent receives (step 156) a message addressed to node having a local binding, the foreign agent can forward the message (step 158) to the destination node. This technique can provide IP-based communication between mobile nodes, not only when connectivity fails between a mobile node and its home agent, but when the foreign agent finds itself unable to communicate with other agents/routers.

Host-to-Host Communication

In some circumstances, a mobile node may fail to communicate not only with a home agent, but may even fail to establish, or lose, connectivity with a foreign agent. Traditionally, in such circumstances, the mobile node may find itself isolated and unable to receive messages. FIGS. 19 to 23, however, illustrate a technique that enables a mobile node to communicate with other mobile nodes, even in the absence of contact with a foreign agent.

Figure 19:
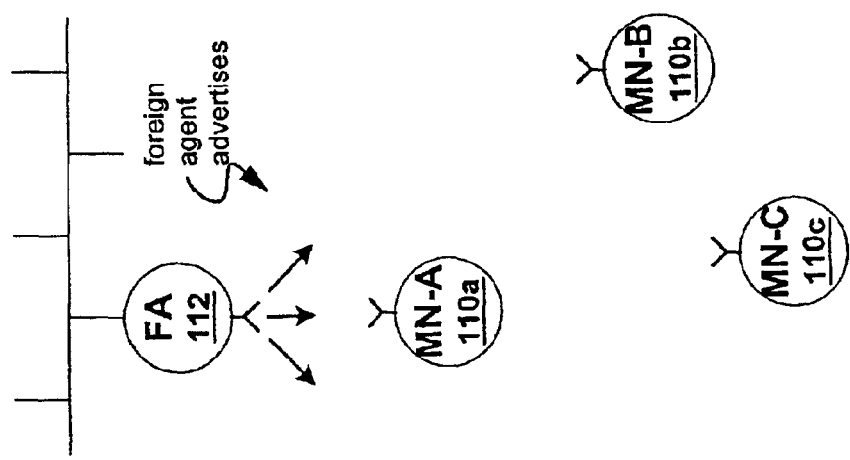
FIGS. 19 to 23 are diagrams illustrating peer-to-peer communication between mobile nodes.
Figure 20:
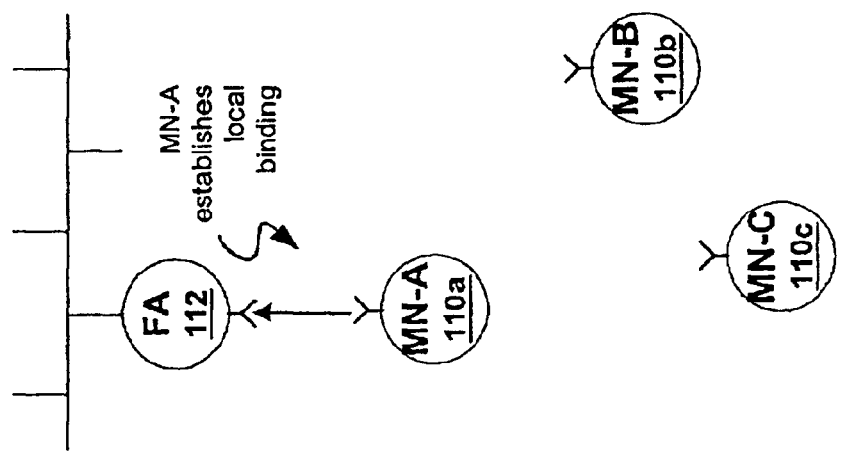

As shown in FIG. 19, a foreign agent 112 periodically advertises its availability to mobile nodes 110a–110c as describe above. As shown in FIG. 20, one of the mobile nodes 110a receives the advertisement, is satisfied with the services offered by the foreign agent 112, and responds by establishing a local binding with the foreign agent. Mobile nodes 110b, 110c, however, fail to establish a physical link with the foreign agent 112. For example, the mobile nodes 110b, 110c may be beyond a radio transmission range of the foreign agent's 112 sub-network. Thus, mobile nodes 110b, 110c fail to establish local bindings with the foreign agent 112.

Figure 21:
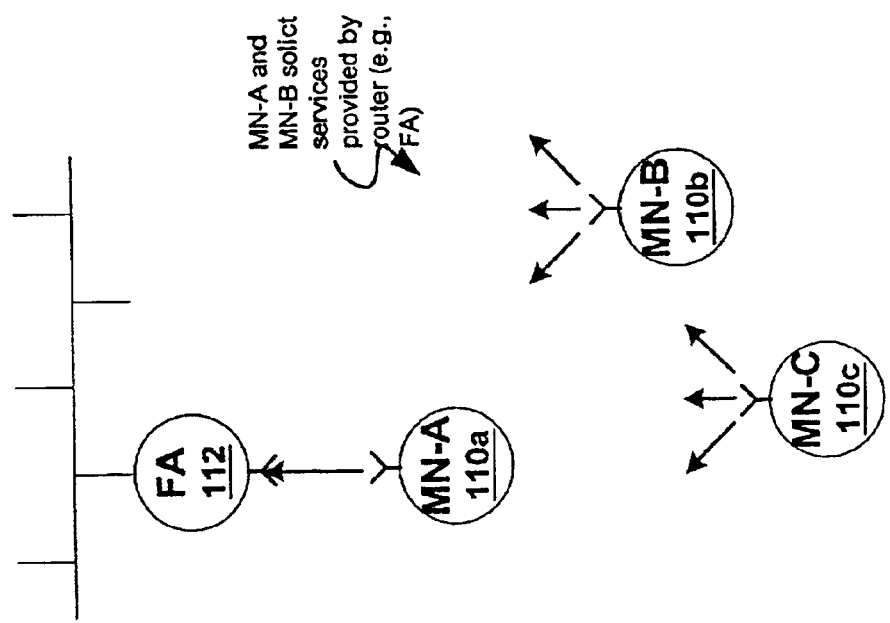
Figure 22:
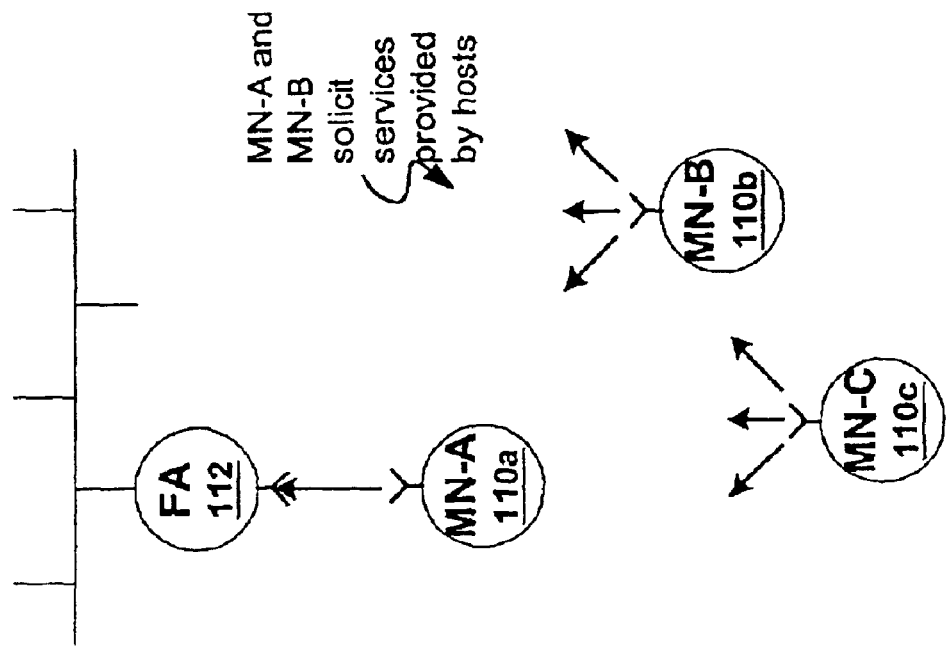

If a mobile node 110b–110c fails to contact a foreign agent 112, the mobile node 110b–110c may begin sending requests for service. For example, as shown in FIG. 21, failing to receive a response from a foreign agent 112, mobile nodes 110b, 110c can send messages requesting service. Such messages may request different levels of service. For example, in FIG. 21, the mobile nodes 110b, 110c request services that include routing (i.e., forwarding of messages received from one network node to another network node). The mobile nodes 110b, 110c may downgrade their requests until the node receives a response. For example, as shown in FIG. 22, if a request for routing services fails, the mobile nodes 110b, 110c can downgrade their service request to a request for communication with a host (i.e., a node not offering routing services).

Figure 23:
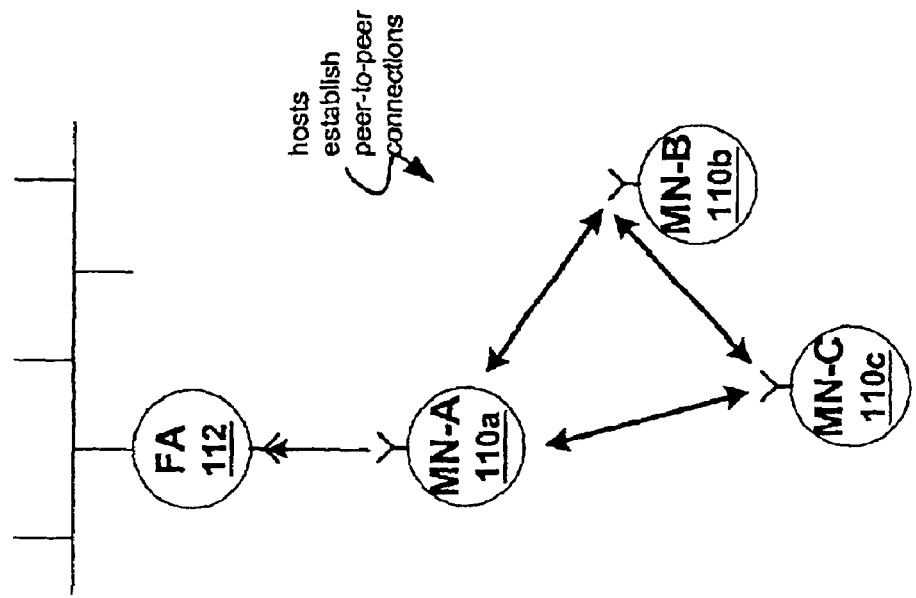

As shown in FIG. 23, while mobile nodes 110b, 110c cannot establish communication with a foreign agent 112, nodes 110b, 110c can at least establish communication with each other 110b–110c, mobile node 110a, and other hosts. That is, mobile node 110b can exchange messages with mobile nodes 110a and 110c. While mobile nodes 110a–110c do not provide routing services (i.e., mobile node 110b cannot forward a message from mobile node 110a to mobile node 110c and mobile node 110a cannot forward message received on the sub-network), the mobile nodes 110a–110c can, nevertheless, exchange messages with adjacent mobile nodes 110a–110c. Thus, even when network conditions prevent communication with a foreign agent 112, these techniques can at least provide the mobile nodes with IP-based communication with other hosts.

Figure 24:
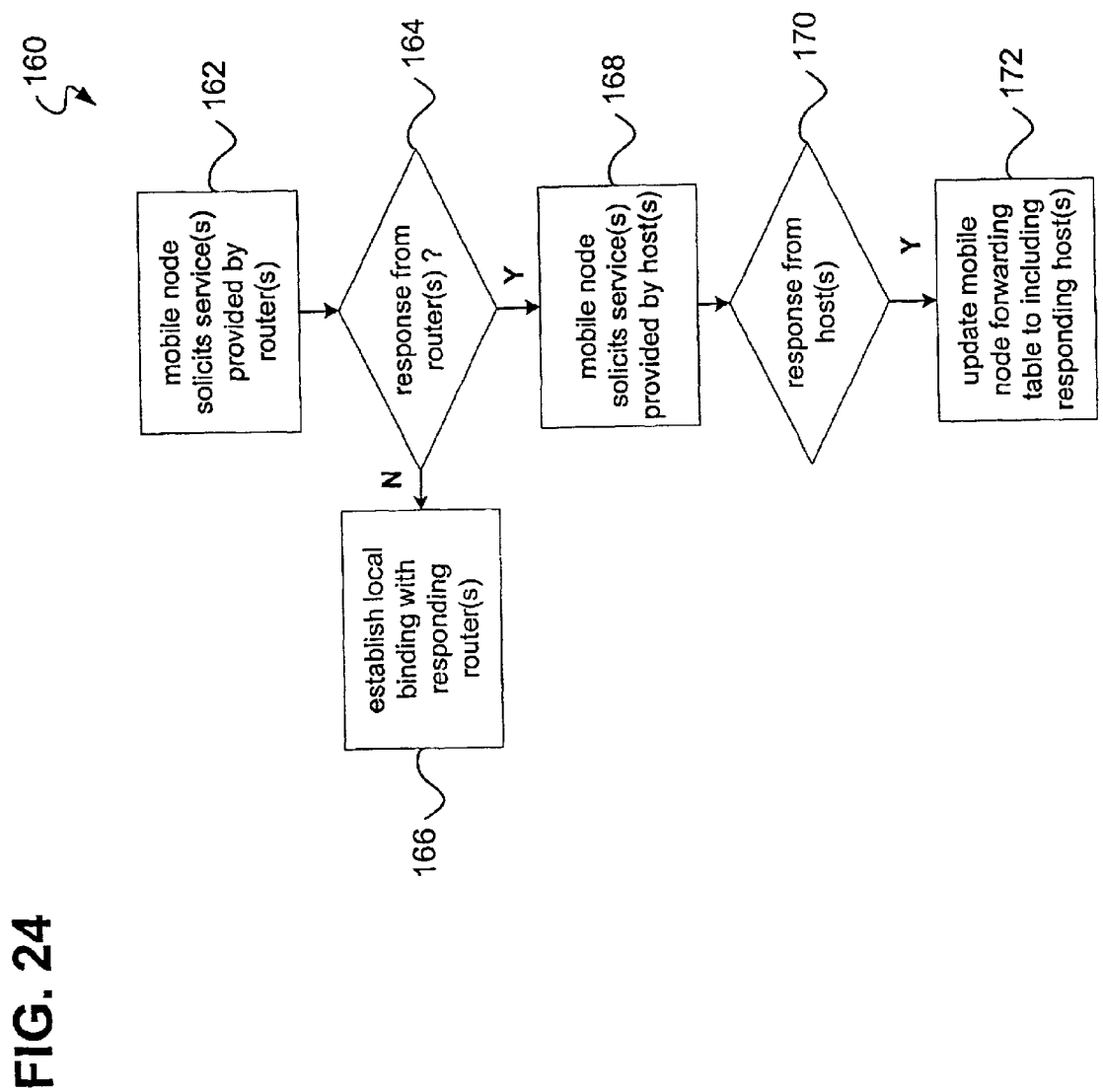
FIG. 24 is a flow-chart of a process for peer-to-peer communication between mobile nodes.

FIG. 24 shows an example of a process 160 illustrated in FIGS. 17 to 21. After a mobile node solicits (step 162) router services and does not receive (step 164) a response, the mobile node can downgrade (step 168) the services requested until the mobile node requests contact with other hosts. Upon receiving (step 170) a response from another host and modifying the host's message forwarding table (step 172), the mobile node can exchange messages with the responding host.

Security

Messages that affect routing state should be authenticated. In particular, messages that may, in the course of proper operation, be received from arbitrary points on the network are particularly susceptible to spoofing attacks.

Messages between a mobile node and its home agent can use manual keying since there is presumably a close administrative relationship. A way to avoid manual keying is to use a key negotiation protocol based on public key cryptography and certificates. A straightforward choice within the domain of the Internet Protocol is to use the IPsec protocols (RFC 2401). This involves using either Authentication Header (AH, RFC 2402) or Encapsulating Security Payload (ESP, RFC 2406) to provide integrity and data origin authentication for the binding requests. Also, one can use the Internet Key Exchange (IKE, RFC 2409), which includes the Internet Security Association and Key Management Protocol (ISAKMP, RFC 2408) and the OAKLEY Key Determination Protocol (RFC 2412). However, IKE requires the two nodes wishing to establish a security association to exchange messages. However, a node attempting to establish a local binding is typically not at its topologically correct location. Therefore, messages from the responding node are sent via normal routing to the mobile node's home sub-network, rather than to the node's current location. So, key exchange requires modifying the routing table. Since key exchange is not yet complete during key exchange, this requires modifying the routing table based on an unauthenticated message.

Another solution is based upon sending the IKE reply message other than via normal routing, and conveying in the IKE messages the information necessary to send the reply message. In the case of a local binding, the mobile node is the IKE Initiator, and a foreign agent is the IKE Responder. The mobile node includes in its IKE messages to the foreign agent an extension which contains the link layer address of the mobile node (typically the Ethernet address, in the case of wired Ethernets or Ethernet-like wireless LANs). The foreign agent, as Responder, sends the reply message not via normal routing, but via the physical interface over which it received the mobile node's message. The link layer destination of the reply is set to the address contained in the mobile node's IKE extension message. No record of the link layer address is kept at the foreign agent; the extension is present on every message from the mobile node. In this way, the mobile node and foreign agent can complete a security association after the exchange of several pairs of messages. Then, the mobile node can obtain an authenticated agent advertisement from the foreign agent, send an authenticated local binding request, and obtain an authenticated reply.

The case of a remote binding is similar. The mobile node has already obtained a local binding. Rather than including the link layer address in the extension message, the mobile node includes a notation that the reply message should be tunneled and the care-of address (COA) for its local binding. The corresponding host (which may be the home agent) is the IKE responder and sends the IKE reply encapsulated with an outer destination of the IP address contained in the IKE extension. Again, the corresponding host keeps no record of the care-of address of the mobile node; the extension is present on every message from the mobile node.

The format of the extension message is not critical. A simple method would be to have a code word which either means "link layer address" or "IP address for tunneling", followed by a length in bytes for the address and the address data itself. An implementation of this technique on an existing operating system may turn out to be somewhat awkward, since operating systems typically have a routing table but do not have operations to send packets via alternate routes. In such cases, a shortcut which eases the implementation work but has a minor degradation in security properties may be deemed acceptable. The shortcut consists of temporarily modifying the routing table to forward messages for the mobile node to either its alleged link layer address or care-of address, sending the IKE response message, and then restoring the routing table to its previous contents. If no other messages are sent to the mobile node during the time the routing table is in this temporary state, this implementation shortcut is not visible from the behavior of the machine. The risk is that some number of packets intended for the mobile node may be misdirected in either the case that the IKE request is from some entity which is not the mobile node or the case that the IKE request has been modified in transit. If this shortcut is used on a system implemented with an operating system kernel and daemons in separate address spaces for the mobility protocol and key management, it may be convenient for the IKE daemon to request of the mobility protocol daemon that these temporary routing table changes occur. A sequence could proceed:

(1) IKE requests Mobility to install temporary route
(2) Mobility installs temporary route, removing any previous route
(3) Mobility acknowledges to IKE that the route is installed
(4) IKE sends the message
(5) IKE informs Mobility that the temporary route is no longer needed (6) Mobility removes the temporary route and installs the proper route (7) Mobility acknowledges to IKE that the operation is complete.

Alternatively, (6) could be performed after some timeout after (2) or (3) in the event (5) does not occur, to guard against persistent errors in the case of failure of the IKE daemon.

Implementations

Different implementations may include one or more of the techniques described above. Additionally, implementations may include a variety of different features. For example, local and remote bindings may have limited lifetimes.

Figure 25:
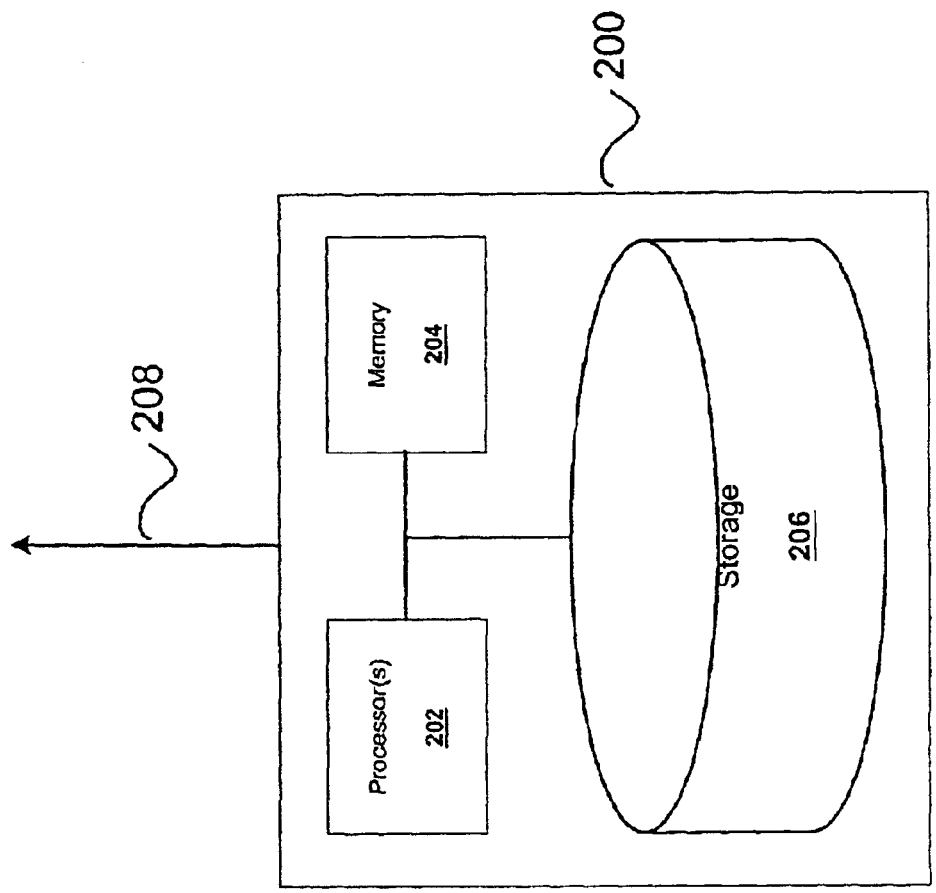
FIG. 25 is a diagram of a computer.

The techniques described herein are not limited to any particular hardware or software configuration; they may find applicability in any computing or processing environment. The techniques may be implemented in hardware or software instructions, or a combination of the two. Preferably, as shown in FIG. 25, the techniques are implemented in computer programs executing on programmable computer 200 that includes a processor 202, a storage medium readable by the processor (including volatile 204 and non-volatile 206 memory and/or storage elements). The computer may also feature one or more wireless and/or wire network connections 208. Such a computer may be any of the entities described herein (e.g., router, host, or other network node).

Each program is preferably implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method for use by a first mobile host, the first mobile host having a first network layer address prefix, for identifying a network node to communicate with, the method comprising:

sending by the first mobile host a first service solicitation to attempt to identify a router with which the first mobile host can communicate;

determining by the first mobile host that no routers are available with which to communicate;

sending by the first mobile host, in response to the determination, a second service solicitation requesting a network layer address of another mobile host with which the first mobile host can communicate; and receiving, by the first mobile host, a response message to the second service solicitation, the response message including a network layer address of a previously unknown second mobile host with which the first mobile host can communicate, the second mobile host having a network layer address prefix different from the first network layer address prefix.

2. The method of claim 1, wherein determining that no routers are available comprises waiting for a router availability message.

3. The method of claim 2, wherein waiting for the router availability message comprises waiting for a message addressed to a multicast address.

4. The method of claim 1, wherein determining that no routers are available comprises sending a message querying for available routers.

5. The method of claim 1, further comprising sending a message to the second mobile host.

6. The method of claim 1, wherein determining that no routers are available comprises attempting to identify a router providing a first set of services.

7. The method of claim 6, wherein determining that no routers are available comprises attempting to identify a router providing a second set of services.

8. The method of claim 1, wherein the router comprises a foreign agent.

9. The method of claim 1, wherein the first mobile host comprises a wireless host.

10. The method of claim 9, wherein the second host comprises a wireless host.

11. A computer program product, disposed on a computer readable medium for use by a first mobile host, the first mobile host having a first network layer address prefix, for identifying a network node to communicate with, the computer program product including instructions for causing the first mobile host to:

send a first service solicitation to attempt to identify a router with which the first mobile host can communicate;

determine that no routers are available with which to communicate;

send, in response to the determination, a second service solicitation requesting a network layer address of another mobile host with which the first mobile host can communicate; and receive, a response message to the second service solicitation including a network layer address of a previously unknown second mobile host with which the first mobile host can communicate, the second mobile host having a network layer address prefix different from the first network layer address prefix.

12. The computer program of claim 11, wherein the instructions for causing the first mobile host to to determine that no routers are available comprise instructions for causing the processor to wait for a router availability message.

13. The computer program of claim 12, wherein the instructions for causing the first mobile host to wait for the router availability message comprise instructions for causing the first mobile host to wait for a message addressed to a multicast address.

14. The computer program of claim 11, wherein the instructions for causing the first mobile host to determine that no routers are available comprise instructions for causing a first mobile host to send a message querying for available routers.

15. The computer program of claim 11, further comprising instructions for causing the first mobile host to send a message to.

16. The computer program of claim 11, wherein the instructions for causing the first mobile host to determine that no routers are available comprise instructions for causing the first mobile host to attempt to identify a router providing a first set of services.

17. The computer program of claim 16, wherein the instructions for causing the first mobile host to determine that no routers are available comprise instructions for causing the first mobile host to attempt to identify a router providing a second set of services.

18. The computer program of claim 11, wherein the router comprises a foreign agent.

19. The computer program of claim 11, wherein the first mobile host comprises a wireless host.

* * * * *